United States Patent
Nelson et al.

(10) Patent No.: US 11,141,809 B2
(45) Date of Patent: Oct. 12, 2021

(54) ELECTRON BEAM ADDITIVE MANUFACTURING

(71) Applicant: Raytheon Company, Waltham, MA (US)

(72) Inventors: Norman Dana Nelson, Rowley, MA (US); Curtis B. Carlsten, Seekonk, MA (US); Mark J. Pistorino, Wakefield, MA (US)

(73) Assignee: Raytheon Company, Waltham, MA (US)

( * ) Notice: Subject to any disclaimer, the term of this patent is extended or adjusted under 35 U.S.C. 154(b) by 546 days.

(21) Appl. No.: 15/780,864

(22) PCT Filed: Dec. 1, 2016

(86) PCT No.: PCT/US2016/064435
§ 371 (c)(1),
(2) Date: Jun. 1, 2018

(87) PCT Pub. No.: WO2017/096050
PCT Pub. Date: Jun. 8, 2017

(65) Prior Publication Data
US 2018/0272460 A1    Sep. 27, 2018

Related U.S. Application Data

(60) Provisional application No. 62/263,288, filed on Dec. 4, 2015.

(51) Int. Cl.
*B23K 15/00* (2006.01)
*B23K 26/342* (2014.01)
(Continued)

(52) U.S. Cl.
CPC .......... *B23K 15/0086* (2013.01); *B22F 10/20* (2021.01); *B23K 9/04* (2013.01);
(Continued)

(58) Field of Classification Search
None
See application file for complete search history.

(56) References Cited

U.S. PATENT DOCUMENTS

| 4,914,268 A | 4/1990 | Hixon et al. |
| 5,294,771 A | 3/1994 | Pratt |

(Continued)

FOREIGN PATENT DOCUMENTS

| CN | 104190930 | 12/2014 |
| EP | 0785043 | 7/1997 |

(Continued)

OTHER PUBLICATIONS

PCT/US2016/064435; PCT International Search Report and Written Opinion of the International Searching Authority dated Mar. 7, 2017.

(Continued)

*Primary Examiner* — Geoffrey S Evans
(74) *Attorney, Agent, or Firm* — Renner, Otto, Boisselle & Sklar, LLP

(57) ABSTRACT

A method and apparatus particularly for additively manufacturing materials that are susceptible to hot cracking. The additive manufacturing process may include a leading energy beam (16) for liquefying a raw material to form a melt pool (20), and a trailing energy beam (17) directed toward a trailing region of the melt pool. The trailing energy beam may be configured to enhance agitation and/or redistribution of liquid in the melt pool to prevent hot cracking, reduce porosity, or improve other characteristics of the solidified part. The method and apparatus also may improve processing parameters, such as adjusting vacuum level to prevent volatilization of alloying agents, or providing a chill plate to control interpass temperature. The process may be used to form new articles, and also may be used to enhance (Continued)

tailorability and flexibility in design or repair of pre-existing articles, among other considerations.

31 Claims, 6 Drawing Sheets

(51) Int. Cl.
| | |
|---|---|
| B33Y 10/00 | (2015.01) |
| B23K 15/06 | (2006.01) |
| B23K 26/70 | (2014.01) |
| B23K 26/073 | (2006.01) |
| C22C 32/00 | (2006.01) |
| B23K 26/06 | (2014.01) |
| B23K 26/067 | (2006.01) |
| C22C 1/04 | (2006.01) |
| B22F 10/20 | (2021.01) |
| B33Y 70/00 | (2020.01) |
| B23K 26/12 | (2014.01) |
| B23K 26/323 | (2014.01) |
| B23K 9/04 | (2006.01) |
| B23K 26/08 | (2014.01) |
| C22C 21/08 | (2006.01) |
| B23K 103/10 | (2006.01) |
| B22F 3/24 | (2006.01) |

(52) U.S. Cl.
CPC ............ *B23K 15/004* (2013.01); *B23K 15/06* (2013.01); *B23K 26/067* (2013.01); *B23K 26/0608* (2013.01); *B23K 26/0676* (2013.01); *B23K 26/073* (2013.01); *B23K 26/0734* (2013.01); *B23K 26/0736* (2013.01); *B23K 26/08* (2013.01); *B23K 26/1224* (2015.10); *B23K 26/323* (2015.10); *B23K 26/342* (2015.10); *B23K 26/703* (2015.10); *B33Y 10/00* (2014.12); *B33Y 70/00* (2014.12); *C22C 1/0416* (2013.01); *C22C 21/08* (2013.01); *C22C 32/0036* (2013.01); *B22F 2003/248* (2013.01); *B23K 2103/10* (2018.08)

(56) References Cited

U.S. PATENT DOCUMENTS

| | | | | |
|---|---|---|---|---|
| 6,024,792 | A * | 2/2000 | Kurz | B23K 35/3046 117/9 |
| 6,269,540 | B1 | 8/2001 | Islam et al. | |
| 6,639,173 | B1 | 10/2003 | Murphy | |
| 8,747,956 | B2 | 6/2014 | Kennedy | |
| 9,527,165 | B2 * | 12/2016 | Bruck | B29C 64/153 |
| 2005/0028897 | A1 * | 2/2005 | Kurz | B23K 26/0608 148/525 |
| 2005/0173380 | A1 | 8/2005 | Carbone | |
| 2008/0115863 | A1 | 5/2008 | McCrink | |
| 2008/0251504 | A1 | 10/2008 | Lu et al. | |
| 2009/0252643 | A1 | 10/2009 | Doty | |
| 2010/0112375 | A1 * | 5/2010 | Chiovelli | B23K 10/027 428/654 |
| 2010/0270274 | A1 | 10/2010 | Taminger et al. | |
| 2011/0008530 | A1 | 1/2011 | Woods | |
| 2011/0114839 | A1 | 5/2011 | Stecker | |
| 2011/0240607 | A1 | 10/2011 | Stecker et al. | |
| 2013/0008879 | A1 | 1/2013 | Bichsel | |
| 2014/0134449 | A1 * | 5/2014 | Kou | B23K 20/128 428/594 |
| 2014/0163717 | A1 | 6/2014 | Das et al. | |
| 2014/0230974 | A1 | 8/2014 | Lin | |
| 2014/0259666 | A1 | 9/2014 | Baughman et al. | |
| 2015/0044084 | A1 | 2/2015 | Hofmann et al. | |
| 2015/0132181 | A1 | 5/2015 | Anderson | |
| 2015/0298213 | A1 * | 10/2015 | Beyer | B22F 5/10 419/7 |
| 2015/0367446 | A1 * | 12/2015 | Buller | B23K 15/0086 219/74 |
| 2016/0016253 | A1 * | 1/2016 | Zimmerman | B23K 15/0086 219/121.17 |
| 2016/0175929 | A1 | 6/2016 | Colin et al. | |
| 2016/0214211 | A1 * | 7/2016 | Gregg | B23K 26/342 |
| 2016/0250717 | A1 * | 9/2016 | Kruger | B23K 26/0006 219/76.1 |
| 2016/0311023 | A1 * | 10/2016 | Schirtzinger | B33Y 10/00 |
| 2017/0008126 | A1 * | 1/2017 | Long | B23K 26/342 |
| 2017/0102689 | A1 * | 4/2017 | Khajepour | G05B 19/4099 |

FOREIGN PATENT DOCUMENTS

| | | |
|---|---|---|
| EP | 0785043 A1 | 7/1997 |
| WO | 2003/031108 | 4/2003 |
| WO | 2014/111707 | 7/2014 |
| WO | 2014/210338 | 12/2014 |
| WO | 2015/092442 | 6/2015 |
| WO | WO2018/169766 A2 | 9/2018 |

OTHER PUBLICATIONS

Taminger et al.; "Electron Beam Freeform Fabrication (EBF³) for Cost Effective Near-Net Shape Manufacturing"; NASA Center for AeroSpace Information; Mar. 2006; NASA/TM-2006-214284.
6061 aluminium alloy, Feb. 20, 2009, Wikipedia (Year: 2009).
6061-T6 Aluminum, Nov. 29, 2014, Makeitforom.com (Year: 2014).
ASM International; "Properties and Selection: Nonferrous Alloys and Special-Purpose Materials"; "Metals handbook-Properties and selection: nonferrous alloys and special-purpose materials," Dec. 31, 1990; pp. 102-103.

* cited by examiner

ELECTRON BEAM ADDITIVE MANUFACTURING

RELATED APPLICATIONS

This application is a national phase of International Application No. PCT/US2016/064435 filed Dec. 1, 2016 and published in the English language, which claims the benefit of U.S. Provisional Application No. 62/263,288 filed Dec. 4, 2015, all of which are hereby incorporated herein by reference in their entireties.

FIELD OF INVENTION

The present invention relates generally to fusion processing, and more particularly to additive manufacturing of metals or alloys, for example, using electron beam additive manufacturing, such as for metals or alloys susceptible to hot cracking.

BACKGROUND

Materials such as aluminum alloys are widely used in modern aerospace structures due to their light weight, relatively high strength, and corrosion resistance. Although strong, aluminum alloys typically are easily worked because they are malleable and ductile, which allows for traditional fabrication techniques to be utilized, including casting, welding, or machining. However, such traditional fabrication techniques may be expensive, wasteful, and may require long lead times. For example, the casting process includes high-costs, such as for tooling, and long lead times to create large cast structures. The machining process may require a milling center with a large bed for accommodating large structures such as billets or forgings, and there is also significant material waste associated with removing material, which may be upwards of 95% of the billet or forging being removed. The welding process combines sub-components that are machined and prepared, and there is significant labor and fixturing that is often required.

SUMMARY OF INVENTION

Additive manufacturing (AM) offers improvements over traditional fabrication processes in terms of reducing capital expenditures for tooling and molds, reducing lead times and material waste, among other considerations. A number of additive manufacturing processes for materials such as metals or alloys have been developed over the years, including powder bed techniques, such as Selective Laser Sintering (SLS), Selective Laser Melting (SLM), and Electron Beam Melting (EBM); and direct energy deposition techniques, such as Laser Engineering Net Shape (LENS), powder or wire-based Laser Metal Deposition (LMD), and Electron Beam Additive Manufacturing (EBAM).

While there have been advances in the foregoing additive manufacturing techniques, there have been challenges with using some of these techniques with metals or metal alloys that are susceptible to a phenomenon known as hot cracking. Hot cracking is a high-temperature cracking mechanism that is mainly a function of how a metal alloy solidifies from a liquid melt, and thus is a problem for those additive manufacturing techniques in which a melt pool is formed. Typically, hot cracking occurs during solidification of the melt pool where dendritic structures act to block liquid melt from replenishing regions of the melt pool where volume is lost due solidification shrinkage. Aluminum alloys, for example, may be particularly susceptible to hot cracking, and are considered difficult to fuse autogenously (without a filler alloy addition). However, using such filler materials with these alloys may degrade the alloy properties, making the final component unusable in certain applications such as aerospace. The issue of hot cracking also makes components made from such alloys difficult to repair or tailor.

The ability to use additive manufacturing for the development of metal or alloy components, such as those made from aluminum alloys, would be highly beneficial. For example, the aluminum 6061 alloy (Al 6061) is widely used in the aerospace and defense industries, and the ability to additively manufacture parts made from such an alloy would improve time to market for new products and enable faster response time for the production of repair components. Such components could be produced from existing designs possibly without modification for small lot production. Large extrusions made by traditional techniques may have a delivery lead time of 18 to 24 months. The ability to additively manufacture such alloys could reduce the lead time to weeks. However, alloys such as Al 6061 have proven difficult to form with additive manufacturing techniques. There is currently no known electron beam additive manufacturing process that can deposit this alloy successfully.

The present invention provides improvements in manufacturing techniques and apparatus for forming materials that are susceptible to hot cracking.

More particularly, the present invention may provide improvements in additively manufacturing metals or metal alloys, such as aluminum alloys, in which the raw material is liquefied during the process and forms a molten pool which thereafter solidifies.

For example, according to one aspect of the invention, a method of additive manufacturing is provided that includes: providing a raw material in solid state form; exposing the raw material to a leading energy beam thereby liquefying the raw material; forming a melt pool with the liquefied raw material, where the melt pool has a leading region and a trailing region; and exposing the trailing region of the melt pool to a trailing energy beam.

The melt pool may be formed by the liquefied raw material as the leading energy beam moves in a travel direction along an x-y plane. The leading region of the melt pool may be proximal to the leading energy beam and may contain a liquid phase, and the trailing region of the melt pool may follow the leading region and may contain a solid-liquid phase. As the melt pool solidifies behind the trailing region, a re-solidified layer may form that follows the path of the melt pool in the travel direction. This process may be repeated at one or more locations for additively building a three-dimensional structure re-solidified layer by re-solidified layer.

The trailing energy beam may be directed toward the trailing region of the melt pool to prevent hot cracking as the melt pool solidifies.

For example, the trailing energy beam may be configured to have a power level, power density, pulsation, beam pattern, and/or positional relationship that is sufficient to break-up or disrupt the formation of dendritic structures in the trailing region of the melt pool.

For example, the trailing energy beam may be configured to re-heat or re-melt dendritic structures in the melt pool, enhance agitation through convective currents and/or pulsing electromagnetic fields that may cause turbulence in the melt pool, and/or redistribute liquid constituents in the melt pool to replenish lost volume due to solidification shrinkage, among other considerations.

In some embodiments, the trailing energy beam may be configured in a beam pattern that corresponds to a shape of the trailing region of the melt pool.

For example, in some embodiments, the trailing energy beam may be configured in a concave pattern that opens toward the leading region of the melt pool.

In some embodiments, the trailing energy beam may be spaced apart from the leading energy beam at a fixed distance as the respective energy beams move together in the travel direction.

In some embodiments, the trailing energy beam may be dynamically altered during the process so as to further enhance agitation of the melt pool and provide a stirring effect from convective currents and/or electromagnetic forces.

For example, in some embodiments, the trialing energy beam may move back and forth at the trailing region, or may cycle through various positions relative to the leading energy beam.

Such process(es) may enhance redistribution of liquid melt from the leading region toward the solidifying portions of the trailing region, which may prevent hot cracking, reduce porosity, and improve strength and ductility of the manufactured part.

In some embodiments, the trailing energy beam may be used to re-heat the re-solidified layer to provide stress relief or annealing, which may reduce the potential for cracking.

One problem that is found with some traditional additive manufacturing methods is that it may be difficult to maintain compositional control of the solidified material. For example, some traditional additive manufacturing processes may be conducted under vacuum conditions with pressure levels greatly below atmospheric pressure (e.g., less than 100 microtorr), and at elevated processing temperatures sufficient to melt the raw material. Based on such traditional processing conditions, it is found that alloying agents may vaporize during the process, which may increase porosity of the solidified material and/or change its chemical composition, thereby altering material properties.

The vacuum level used during an additive manufacturing process according to some embodiments of the invention may be decreased compared to traditional processing parameters, bringing the pressure level closer to atmospheric pressure (but still below atmospheric pressure) so as to reduce vaporization of one or more alloying agents during the additive manufacturing process, which may thereby reduce hot cracking and/or reduce internal porosity in the additively manufactured article.

For example, according to an aspect of the invention, a method of additive manufacturing may be provided that includes: providing a metal alloy in solid state form, the metal alloy having at least one alloying agent; and exposing the metal alloy to an energy beam thereby heating the metal alloy to a processing temperature that is beyond the melting point of the metal alloy; wherein the additive manufacturing process is conducted in a vacuum chamber; and wherein a pressure level of the vacuum chamber is 500 microtorr or greater for reducing vaporization of the at least one alloying agent at the processing temperature.

Another problem that is found with some traditional additive manufacturing processes is that they may be conducted under vacuum, where no convective heat transfer is available to cool the substrate upon which the melt pool is formed. This may cause heat to uncontrollably accumulate in the substrate, which may affect the interpass temperature where subsequent melt pool formations are made. This uncontrolled process parameter may, in turn, affect the characteristics of the melt pool or the properties of the re-solidified layer.

In accordance with an embodiment of the invention, a chill plate may be provided that is in thermal communication with the substrate. For example, the chill plate may provide active cooling for maintaining a constant interpass temperature of the substrate.

More particularly, according to an aspect of the invention, an additive manufacturing apparatus for layer-by-layer manufacturing of a three-dimensional article may be provided that includes: a material delivery device configured to feed a raw material in a solid state form to a feed region; an energy source configured to emit an energy beam directed at the feed region for liquefying the raw material; a substrate for supporting the liquefied raw material as a molten pool deposit, the substrate providing a heat transfer medium for extracting heat from the molten pool deposit; and a chill plate in thermal communication with the substrate.

In some embodiments, a compressible thermally conductive material may be interposed between the chill plate and the substrate to enhance conductive heat transfer between the substrate and the chill plate.

Another problem with traditional techniques is that they are commonly subtractive in nature, making it difficult to rework or repair damaged components. Thus, an additive manufacturing technique may be advantageous to restore damaged pre-existing components to functional condition.

According to an aspect of the invention, an additive manufacturing process may be provided for repairing features on a pre-existing article.

For example, the additive manufacturing process may include depositing material onto the already-fabricated and damaged component so that the component may be built up with additional material to restore the damaged/missing features.

According to another aspect of the invention, an additive manufacturing process may be provided for tailoring the properties of a pre-existing article.

For example, the material added during the additive manufacturing process may be tailored to provide unique qualities to the pre-existing article. For example, the material added to the pre-existing article may be composed of a material that is more corrosion resistant, higher strength, more wear resistant material, more thermally or electrically conductive, or provide some other different property than the base material that forms the pre-existing article.

Some additive manufacturing techniques build a three-dimensional article layer-by-layer, but in some cases this approach may be relatively time consuming. In addition, certain features may not be feasible by continuous layering of materials, since the deposit time and cost of the materials may be prohibitively expensive.

According to another aspect of the invention, a hybrid additive manufacturing process may be provided that combines a prefabricated article with another article, which may include the steps of: fabricating the prefabricated article; forming the other article using an additive manufacturing process; and combining the prefabricated article with the other article by using the additive manufacturing process.

For example, one or more prefabricated articles having features that are impracticable (or not cost effective) for additive manufacturing may be introduced into the process so that sequential layers of additive manufacturing may incorporate the prefabricated article into the object being produced. During the process, a robotic manipulator may be used to place the prefabricated article in the desired location to be incorporated or combined with the additive manufacturing process.

The prefabricated article may be chosen due to its unique properties. For example, the prefabricated article may have unique thermal transfer, wear resistance, corrosion resistance, strength, or other property.

Alternatively or additionally, the prefabricated article may be chosen due to a unique geometry that is not practicable with additive manufacturing. For example, the prefabricated article may have one or more of the following features: threading, sealing surfaces, sliding interfaces, thermal interfaces, small and complex features, internal cavities, coolant channels, hydraulic channels, wiring conduits, bores, passages, electronics, sensors, and/or ballistic surfaces.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles and aspects of the present invention have particular application to electron beam additive manufacturing (EBAM) of aluminum alloys, such as Al 6061, and will be described below chiefly in this context. It is also understood, however, that the principles and aspects of this invention may be applicable to other manufacturing processes, or other materials, where desirable to: (i) prevent hot cracking and/or reduce porosity of the manufactured article; (ii) enhance the characteristics of the manufactured article, such as material strength, material composition, material heat treatability, stress-relieving or annealing, tailorability and flexibility in design or repair; (iii) improve control over manufacturing process parameters, such as cooling rates or maintaining processing temperatures; (iv) among various other considerations as understood based on the following description.

Figure 1:
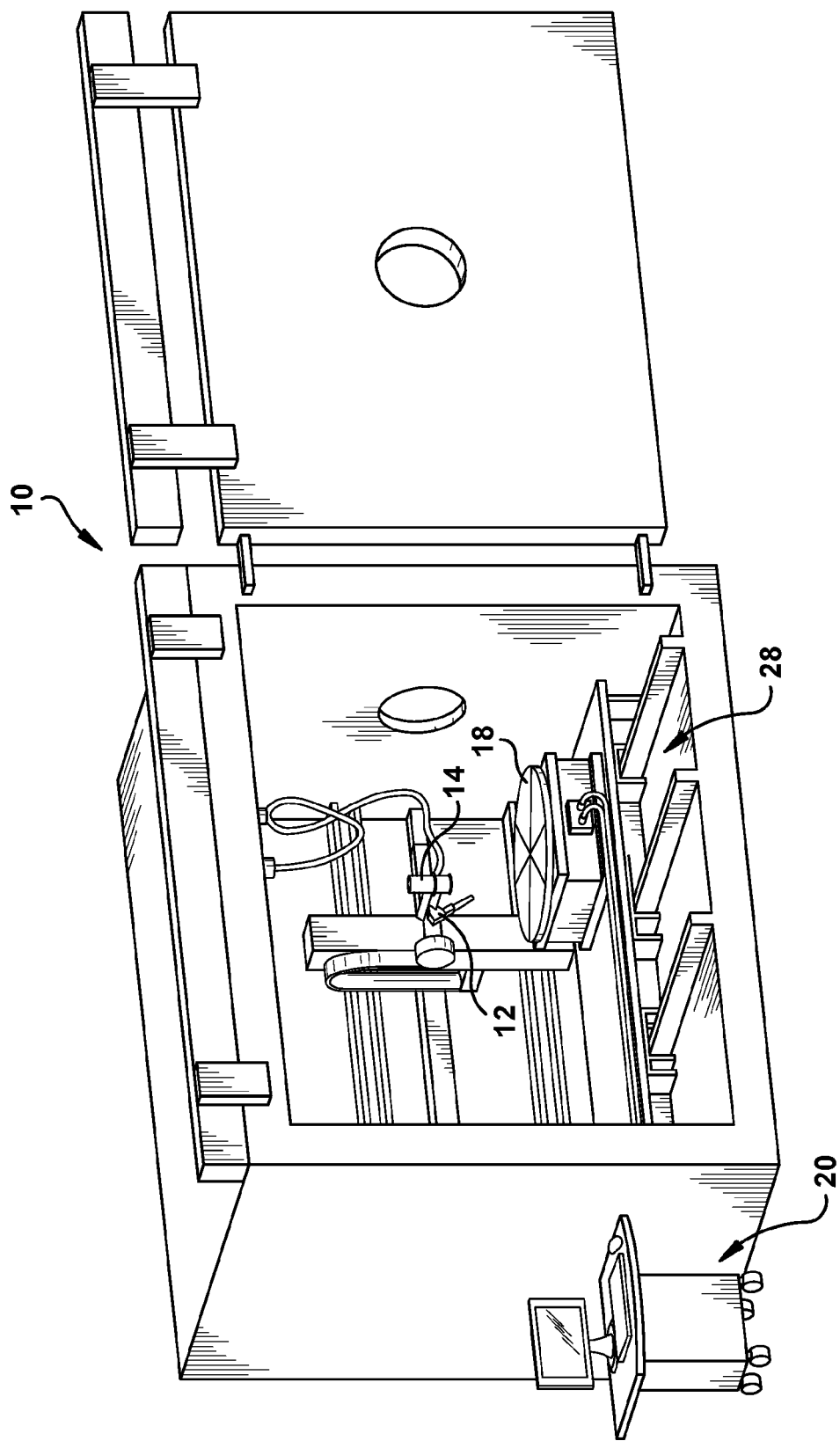
FIG. 1 is a schematic view of an exemplary additive manufacturing apparatus according to an embodiment of the invention.
Figure 2:
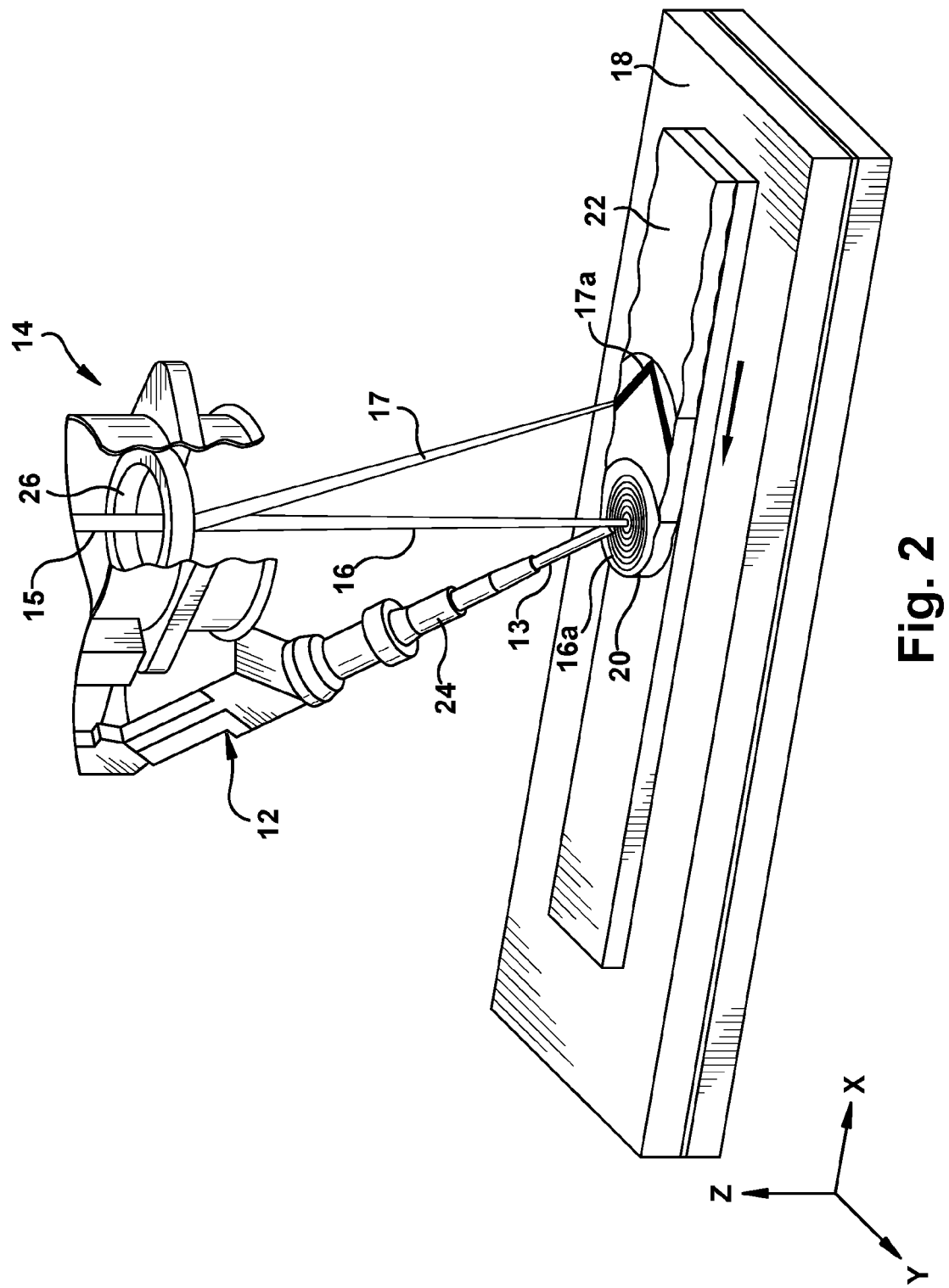
FIG. 2 is an enlarged schematic view of components of the additive manufacturing apparatus in FIG. 1, which are shown during an exemplary additive manufacturing process according to an embodiment of the invention.

Referring to FIGS. 1 and 2, an exemplary electron beam additive manufacturing (EBAM) apparatus 10 is shown. The EBAM apparatus 10 includes at least one material delivery device 12 for delivering raw material 13 in solid state form to a feed region, and an energy source 14 (also referred to as an energy emission device 14), such as an electron beam (EB) generator (e.g., EB gun) that controllably emits at least one energy beam 16, such as an electron beam, for applying energy to liquefy the raw material delivered by the material delivery device 12 at the feed region. A work piece support 18 may be provided for receiving the liquefied raw material. The work piece support 18 may form a substrate, or may support a substrate, onto which the liquefied raw material is deposited as a molten pool deposit 20. As discussed in further detail below, the liquefied raw material in the molten pool deposit 20 solidifies to form a re-solidified layer 22 (shown in FIG. 2, for example), which thereby becomes the substrate upon which additional re-solidified layers are formed. In this manner, the EBAM apparatus 10 may build upon each re-solidified layer to form a three-dimensional article layer-by-layer.

In exemplary embodiments, the raw material 13 is a metal wire, which may be fed with the material delivery device 12 via an actuator or other suitable device at a controlled feed rate. The wire may be fed into the molten pool 20 established by the electron beam 16 though a suitable guide nozzle 24. The distance between the electron beam 16 and the molten pool 20 of the additively manufactured article may be controlled, along with the feed rate, such that the raw material 13 being deposited is a generally continuous stream of material from the feed wire to the molten pool deposit 20, so as to avoid droplets or other discontinuities, or to avoid accumulation and premature solidification. In exemplary embodiments, the material delivery device 12 may accommodate wire feed rates up to about 300 inches per minute (IPM) with wire diameters ranging from about 0.030 inches to about 0.156 inches, or more. The material delivery device 12 may be adjustable for feeding relatively large or relatively small diameter wires, for example, wire diameters below about 7 mm, below about 5 mm, or below about 3 mm, or below about 1 mm. The material delivery device 12 may be adjustable for feeding the wire at relatively high and relatively low feed rates, for example, below about 300 IPM, below about 200 IPM, below about 100 IPM, or below about 50 IPM.

The raw material 13 may include one or any combination of metals or alloys (e.g., metals including a transition metal or an alloy thereof). For example, the raw material 13 may include one or more of titanium, aluminum, iron, nickel, chromium, cobalt, stainless steel, niobium; tantalum, copper, bronze, brass, beryllium, copper, vanadium, or tungsten. In exemplary embodiments, particular examples of the raw material include aluminum or aluminum alloys, such as Al 6061 (e.g., in weight percent, about 0.8-1.2% Mg, about 0.4-0.8% Si, about 0.7% or less Fe, about 0.15-0.40% Cu, about 0.25% or less Zn, about 0.15% or less Ti, about 0.15% or less Mn, about 0.04-0.35% Cr, about 0.05% others, and the balance Al). Other particular examples include other aluminum alloys (e.g., 6xxx-series having Mg and Si; 2xxx-series having Cu; and 7xxx-series having Zn). It is understood that the foregoing examples of raw materials are for illustration and not limitation, and the exemplary apparatus and process described herein may be utilized for any raw material, and may be particularly useful for raw materials that are susceptible to hot cracking during solidification of a melt pool, among other considerations as discussed below.

The energy beam generation device 14 may expose the raw material 13 to sufficient energy to heat the raw material beyond its melting point (e.g., beyond a temperature of a solidus line representative of the alloy composition). By way of example, a suitable electron beam gun may provide energy in the form of a stream of focused electrons accelerated towards the raw material in the feed region by a relatively high voltage potential (e.g., greater than about 15 kilovolts, such as about 30 kilovolts, about 60 kilovolts, about 100 kilovolts, or even about 150 kilovolts, or higher). The electrons may be generated within the EB gun via one or more heated filaments. The power output of the EB gun typically may be controlled by limiting or throttling the flow of electrons toward the feed region. For example, beam current may be greater than about 50, 100, 200, 300, 400 milliamps or more. The total power output level of the emitted electron beam may be about 1 kilowatt to about 30 kilowatts, for example, greater than about 1, 2, 4, 6, 8, 10, 20 kW or more. One approach to the operation of an electron beam gun may be to maintain the parameters of the gun at a sufficient level so that the maximum depth of a molten pool deposit may be maintained substantially constant at a depth less than about 3 cm, such as about less than about 1 cm, and possibly even less than about 0.5 cm.

In exemplary embodiments, the electron beam generation device 14 may be controllably operated and may include a suitable mechanism for directing the location of an emitted energy beam 15, which may thereby be directed at point locations such that two or more preselected power densities can be applied over two or more preselected regions. It is possible that the emitted energy beam 15 may be operated in a generally defocused mode, a generally focused mode, or both. In an exemplary embodiment, the emitted energy beam 15 may be operated in a mode that maintains a generally constant focus of the beam, which is deflected and translated during subsequent raster frames. For example, a beam having a width of about 0.5 to about 0.8 mm may be rastered to cover an effective width of about 1.0, 2.0, 3.0 mm, 10 mm, or larger. In this manner, a relatively large amount of energy may be dispersed over a relatively large area, but to a relatively shallow depth, as compared with traditional electron beam welding.

One approach for utilizing such rastering may involve the use of an electron beam generating device that provides for focusing and/or deflecting the electron beam, and directing point location, by using one or more deflection coils, such as one or more programmable electromagnetic coils 26. The step of emitting the electron beam 15 during successively repeating steps may include emitting the beam using a substantially constant clock rate throughout the repeating steps, and the translating of the electron beam may include deflecting the beam with the one or more electromagnetic coils 26. The translating step may include translating from point to point at a substantially constant clock rate, and throughout the steps a substantially constant frame rate may be employed. A substantially constant frame rate of about 50 Hz to about 1 kHz or more, for example, about 100 Hz, 200 Hz, 400 Hz, 800 Hz or more may be employed; or a clock rate in excess of 1 MHz (e.g., about 1.4 MHz) may be employed; or both. In addition, the operation of the EB gun may be configured so that there is synchronicity between the programmed beam raster path and one or more control signals. For example, a suitable control system may control the operation of the electron beam generating device such as its power, current, voltage, beam characteristic, or any combination thereof.

In exemplary embodiments, the emitted energy beam 15 may be rastered to form one or more beam patterns. For example, as shown in FIG. 2 and discussed in further detail below, the emitted energy beam 15 may be deflected and translated through a raster pattern to include a leading energy beam pattern 16a defined by a leading energy beam 16, and a trailing energy beam pattern 17a defined by a trailing energy beam 17. It is understood that although shown as two separate and simultaneous energy beams 16, 17, the rastering of the single emitted beam 15 is translated from point to point to define the respective patterns 16a, 17a. Thus, it is understood that the leading energy beam 16 (e.g. leading energy beam pattern 16a) and the trailing energy beam 17 (e.g., trailing energy beam pattern 17a) as used herein may refer to the respective beams as provided by such rastering. The rastering of the emitted beam 15 may, during one or more individual frames, transfer a differential in density of heat delivered per unit time as between at least two regions of a frame, such as a differential in power level or power density as between at least two regions. In this manner, the distribution of the total power level of the emitted beam 15 may be split between the leading energy beam 16 and the trailing energy beam 17, or the power density applied over the area defined by the respective patterns 16a, 17a may be split. For example, the total power level may be split between the leading energy beam (L) and the trailing energy beam (T) by a ratio (L:T) of about 25:75, 50:50, 60:40, 70:30, 75:25, 80:20, 85:15, 90:10, 95:5, 96:4, 97:3, 98:2, or 99:1, including all subranges therebetween. It is understood that although shown and described as utilizing a rastering methodology, the at least two separate regions may be exposed to at least two separate energy beams (e.g., 16, 17), which may be emitted from at least two different energy sources, and which may form respective patterns (e.g., 16a, 17a) in any suitable manner.

The work piece support 18, the electron beam generator 14, and/or the material delivery device 12 may be positionally translatable relative to each other. In this manner, the energy beam (e.g., 15, 16, 17) may move in a travel direction, at a travel speed, relative to the substrate (shown with an arrow in FIG. 2, for example) so that the additively manufactured article may be formed layer-by-layer from a plurality of successively deposited (and solidified) molten pool deposits. The travel speed may be relatively fast or relatively slow, for example, 10 IPM or more, such as 15 IPM, 25, IPM, 50 IPM, or 100 IPM, or more. In exemplary embodiments, the energy beam generation device 14 may be translatable in a plurality of axes (e.g., 3, 4, 5 or 6 axes) relative to the work piece support 18 (the latter of which may itself be fixed or translatable). It is understood that the energy beam (e.g., leading energy beam) moving in a travel direction along an x-y plane means that the energy beam moves relative to the substrate, whether it is the energy beam generating device that moves or the substrate that moves. For example, it is understood that the energy beam generation device 14 may be fixed in position, and the work piece support 18 may be moved to various positions relative to the energy beam generation device.

A suitable housing defining a chamber 28 may be employed to enclose at least the material delivery device 12, the electron beam generator 14, and/or the work piece support 18. The chamber 28 may be configured as a vacuum chamber, which may be evacuated as desired for processing. The pressure may be evacuated with one or more suitable vacuum pumps so that the pressure within the chamber ranges from about 5,000 microtorr to about 30 microtorr, or lower, such as about 4,000 microtorr, 3,000 microtorr, 2,000 microtorr, 1,000 microtorr, 500 microtorr, 100 microtorr, or lower. A suitable vacuum pumping arrangement utilizing a combination of mechanical and oil diffusion pumps may be used. The chamber 28 may be such that it provides for suitable vacuum sealing and radiation shielding, and is sufficiently large to house the components necessary for work piece manufacture. For example, a stainless steel chamber may be employed. The internal chamber dimensions may be at least about 48 in.×48 in.×60 in., such as about 68 in.×68 in.×92 in. (L×W×H), or about 48 in.×48 in.×228 in. (L×W×H), or more.

In exemplary embodiments, one or more sensors may be provided for receiving information about one or more processing parameters, or parameters associated with the additively manufactured article. For example, such parameters may include, but are not limited to, wire feed rate, travel speed, position, temperature, power level, voltage potential, beam current, rastering, radiation, etc.

A control system 20 with a suitable controller (which may include at least one microprocessor) may be configured to receive information from the sensors about the processing conditions, such that the controller may change an operating parameter in response to the monitored condition. The control system 20 may be in signal communication with one or more of the material delivery device 12, energy emission device 14, work piece support 18 and/or sensors. For example, the control system 20 may control the operation of the energy emission device 14 such as its translatable position; total power level; total current level; total voltage potential; leading and/or trailing energy beam characteristic(s), including their respective beam patterns, pulsing characteristics, positional relationships, power levels, power densities, voltages, and/or currents; or any combination thereof. The control system 20 may receive instructions from a 3D model having fabrication instructions that, when carried out by the EBAM apparatus 10, result in the fabrication of the desired article. One or more of the controls and data acquisition may be electronically managed through a user interface and display device (e.g., suitable instrumentation, such as one or more computers).

In exemplary embodiments, the process may be performed to fabricate a three-dimensional article (e.g., metallic article) at a rate of about 0.5 cm$^3$/hr to about 3,600 cm$^3$/hr, such as about 1.0, 10, 50, 100, 200, 400, 800, 1,000 cm$^3$/hr, or higher. The process may also be performed to fabricate an article (e.g., metallic article) at a rate of at least about 2.5, 3.0, 3.3, 5 or even 10 kg/hour (e.g. having an average bead width of about 10 to about 15 mm). The steps may be performed at a rate sufficient to deposit the raw material as a plurality of molten pool deposits, or beads, that define successive layers having an average bead width of about 10 to about 15 mm (e.g., about 12.7 mm) at a rate of at least about 25 cm of bead per minute (e.g., about 35 to 80 cm per minute or higher). The process may be interrupted for a period (e.g., of at least one minute, one hour, two hours, one day, or longer) prior to completion of the article, and may be resumed after complete solidification of the article occurs.

In some embodiments, the EBAM apparatus 10 may include one or more components as found in the Sciaky model NG1 VX68. For example, suitable components and apparatus that may be employed in the present teachings include, without limitation, a fully functioning electron beam welding and deposition system utilizing a low voltage moving gun technology, which may include six programmable CNC motion axes including XYZ linear and part rotation (R), part tilt (T), and electron beam gun tilt axes. An electron beam gun such as the Sciaky low voltage 60/60 style electron beam gun may be employed. The entire system may be programmed and controlled via Sciaky's W20XX series CMC and process controller. It is also possible that the teachings herein may employ a separate dedicated computer in addition to the NG1 system controller. Such computer may be configured, for example, to provide a communication link to the NG1 primary controller via Ethernet and may allow for bidirectional data transfer. In some embodiments, the teachings herein may utilize the apparatus and method disclosed in U.S. Application Publication No. 2011/0240607 filed Feb. 17, 2011, which is incorporated herein by reference in its entirety, including, but not limited to, the use of closed-loop control as described therein.

Figure 3:
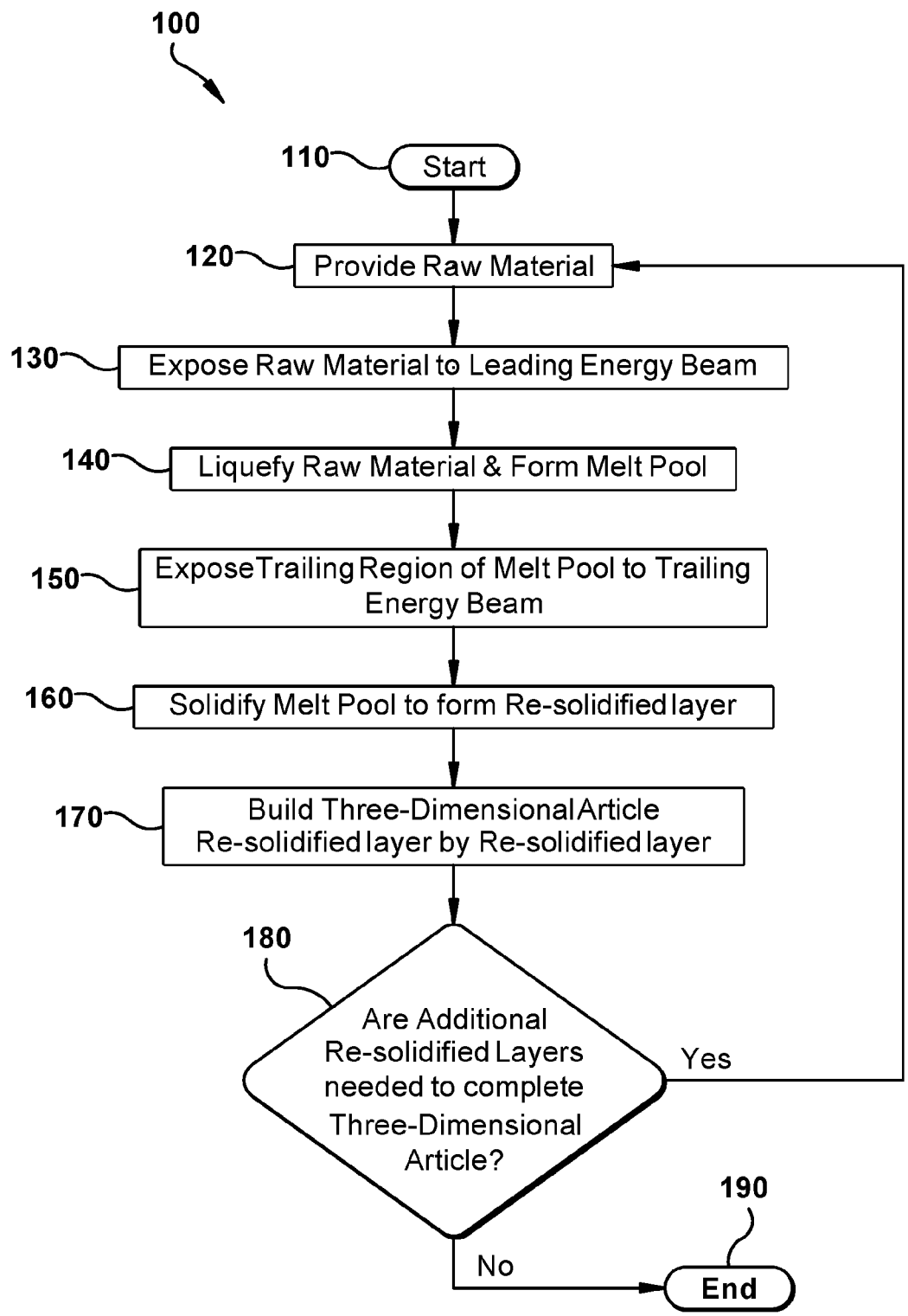
FIG. 3 is a flow chart illustrating an exemplary method of additive manufacturing according to an embodiment of the invention.

Turning to FIG. 3 (with reference to FIG. 2 and FIG. 4), a flow chart illustrating an exemplary method 100 of additively manufacturing a three-dimensional article is shown. The method 100 may begin before step 110 by configuring a model for the article and/or fabrication instructions for the article to be additively manufactured. The article model may be any computer-readable file or files on a non-transitory computer readable medium that collectively specify the structure, materials, and/or other features of the article. This may, for example include CAD files, STL files, and the like that provide three-dimensional descriptions of the article. Fabrication instructions corresponding to a model may be any collection of instructions that, when carried out by an additive manufacturing apparatus or three-dimensional printer, result in the fabrication of the article. For example, fabrication instructions may include a series of instructions for moving to various x,y,z coordinates and controlling power level, beam current, feed rate, travel speed, or other desired parameters. The process 100 may be carried out using suitable digital electronic circuitry, or computer software, firmware, or hardware, as understood by those having skill in the art. For example, during the molten pool deposition process, the material deposition system 10 may receive fabrication instructions from a controller (e.g., control system 20) according to the previously described model.

At step 120, the raw material 13 is provided in solid state form. As discussed above, the raw material 13 (shown in FIG. 2, for example) may be a metal or metal alloy, such as Al 6061, and may be in the form of a wire, which may be fed by the material delivery device 12 at a controlled feed rate to a feed region. It is understood, however, that the raw material may be different materials (e.g., different metals, metal alloys, or non-metals), and may be provided in different forms (e.g., fed via a dispenser as a powder spray, or provided as a powder bed), as would understood by those having skill in the art.

At step 130, the raw material 13 is exposed to the leading energy beam 16. As discussed above, the leading energy beam 16 may be an electron beam emitted from the electron gun 14, where the leading energy beam 16 has sufficient energy to heat the raw material 13 beyond its melting point. The leading energy beam 16 may be derived from the emitted energy beam 15 via rastering to form the leading energy beam pattern 16a, as discussed above. In the illustrated embodiment, the leading energy beam pattern 16a is a circular pattern, and more particularly may be composed of a series of concentric circles, as shown. There may be two or more concentric circles, such as 3, 6, 9, 12 or more such concentric circles. Other leading energy beam patterns are also possible, such as elliptical, parabolic, or polygonal patterns. So as to effectively transmit electrons to impinge upon the raw material 13, the chamber 28 may be under vacuum. It is understood that although the energy beam is an electron beam in the illustrated embodiment, other energy beams are possible as would be understood by those having skill in the art. For example, other types of energy beams may include, but are not limited to, laser, electric arc, plasma, and the like.

Figure 4:
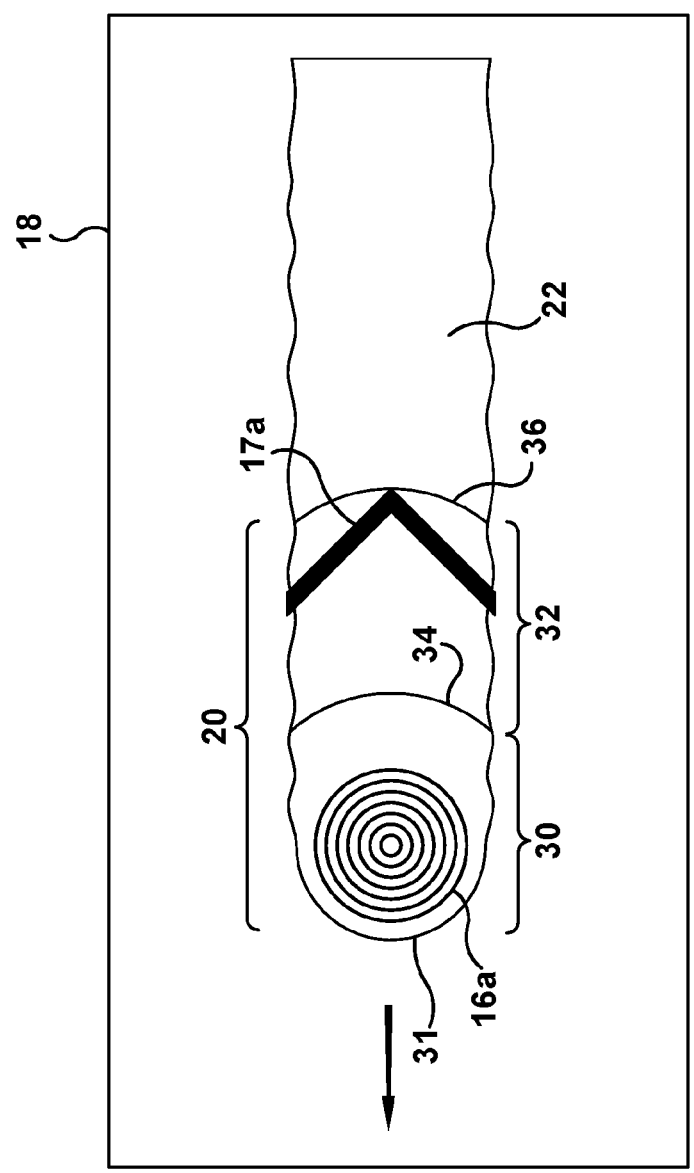
FIG. 4 is schematic plan view illustrating an exemplary process of additive manufacturing according to an embodiment of the invention.

At step 140, the raw material 13 is heated beyond its melting point to liquefy the raw material and form a melt pool 20. As shown in FIGS. 2 and 4, the melt pool 20 may be a molten pool deposit, which may be formed on a substrate. The melt pool 20 may be formed with the liquefied raw material as the leading energy beam 16 moves forward in a travel direction (shown with arrow) along an x-y plane relative to the substrate. As discussed above, the substrate upon which the melt pool is formed may include the work piece support 18 and/or a re-solidified layer 22, or other such substrate capable of receiving and supporting the melt pool 20. The process may be under inert conditions to reduce the formation of oxides in the melt pool. As discussed above, it is possible that instead of the electron gun 14 moving relative to the substrate, that the work piece support 18 may move relative to a fixed energy beam. Furthermore, the x-y plane may be an arbitrary frame of reference, and may include one or more planes other than horizontal. In addition, where other additive manufacturing methods other than EBAM are utilized, it is understood that the melt pool may be formed in a different manner or different location, for example, the melt pool may be formed in a powder bed, and may be carried out in an inert environment, such as by backfilling the chamber with an inert gas, for example, helium, argon, or other suitable gas that does not detrimentally react with the melt pool.

As illustrated in FIG. 4, the melt pool 20 includes a leading region 30 and a trailing region 32. As shown, the leading region 30 is proximal to the leading energy beam (e.g., leading energy beam pattern 16*a*), such as proximal to the region where the leading energy beam 16 impinges and liquefies the raw material 13. In this manner, the leading region 30 of the melt pool may represent the region where fresh liquid melt is deposited (e.g., the region where the raw material is fed), and thus moves with the leading energy beam 16 along the x-y plane. Because the leading region 30 is the region where fresh liquid melt is continuously deposited, the leading region 30, and particularly the forward edge 31 of region 30, may be at a temperature that is greater than the liquidus temperature of the raw material, and thus predominantly contains a liquid phase of the raw material.

As the forward edge of the leading region 30 continues to move forward in the travel direction, the trailing region 32 behind the leading region 30 begins to cool and solidify. In this manner, the melt pool 20 may be fully liquid at the leading region 30, may begin to re-solidify at a forward interface 34 of the trailing region 32, and solidification may progress through the trailing region 32 toward a rearward interface 36 of the trailing region 32 where the material may be completely re-solidified. In other words, the trailing region 32 may be considered to include a liquid phase interface (e.g., the forward interface 34 where the trailing region 32 interfaces with the leading region 30, and which may be representative of the liquidus isotherm of the raw material), a solid phase interface (e.g., the rearward interface 36 where the trailing region 32 interfaces with the re-solidified raw material 22, and which may be representative of the solidus isotherm of the raw material), and a transition region between the liquid phase interface 34 and the solid phase interface 36. The transition region between the liquid interface 34 and the solid interface 32 (which may be at a temperature between the liquidus and solidus temperatures) is the region where solidification and grain growth begins to occur in the melt pool 20, and thus contains a two-phase mixture of solid particulate and liquid metal (e.g., a solid-liquid phase).

During cooling in the transition region, a volumetric change occurs during the liquid-to-solid phase change of the raw material, such that shrinkage occurs in the cooler region of the trailing region 32 near the solid interface 36. Strain in the melt pool caused by such shrinkage may cause porosity or openings to develop in this cooler solidifying region, and if the available supply of liquid metal is insufficient or incapable of filling these openings between the solidifying metal, then hot cracking may occur. The issue of hot cracking may be exacerbated by the formation of dendritic structures in the transition region of the melt pool, which may form narrow channels between solidifying grains that act to choke off or prevent the liquid metal from replenishing the reduced volume caused by solidification shrinkage. For some metals or metal alloys, such as some aluminum alloys (e.g., Al 6061, or other 6xxx-series aluminum alloys), the problem of hot cracking has traditionally been difficult to address. In exemplary embodiments, the additive manufacturing process 100 may be utilized to reduce hot cracking of metals or alloys.

Referring back to FIG. 3 (with reference to FIGS. 2 and 4), at step 150, the trailing region 32 of the melt pool 20 is exposed to the trailing energy beam 17. For example, the trailing energy beam 17 may be directed toward the forward (liquid) interface 34 of the trailing region, the rearward (solid) interface 36 of the trailing region, and/or the transition region between the interfaces 34, 36. In exemplary embodiments, the trailing energy beam 17 is configured to reduce hot cracking as the melt pool 20 solidifies. More particularly, the trailing energy beam 17 may have a power level, power density, pulsation, beam pattern, and/or positional relationship sufficient to break-up or disrupt dendritic structures in the trailing region 32 of the melt pool. For example, the trailing energy beam 17 may be configured to re-heat or re-melt dendritic structures in the melt pool, which may reduce blockages in the melt pool that otherwise prevent liquid melt from replenishing the lost volume due to shrinkage. Alternatively or additionally, the trailing energy beam 17 may be configured to enhance agitation and/or redistribution of the liquid phase in the trailing region of the melt pool. For example, the trailing energy beam 17 may enhance convective currents and/or induce pulsing electromagnetic fields that may generate turbulence in the trailing region of the melt pool, which may reduce the formation of dendrites, allowing for a more equiaxed grain structure, and/or which may enhance liquid metal flow to the solidifying regions of the melt pool. Alternatively or additionally, the trailing energy beam 17 may be configured to stress relieve or anneal the re-solidified raw material behind the trailing edge of the melt pool.

In exemplary embodiments, the trailing energy beam 17 may have a power level or power density that is different than a power level or power density of the leading energy beam 16. Alternatively or additionally, the trailing energy beam 17 may have a trailing energy beam pattern 17*a* that is different than the leading energy beam pattern 16*a* defined by the leading energy beam 16. As discussed above, the difference in power level, power density, pulsation, beam pattern, and/or positional relationship between the trailing energy beam and leading energy beam may be provided by virtue of translating an energy beam, such as the emitted energy beam 15, through a raster pattern. It is understood, however, that other methods of providing a separate and distinct trailing energy beam 17 may be employed, such as by having two separate energy sources that emit respective leading and trailing energy beams, each of which may be rastered, defocused, or translated to form a desired pattern.

In exemplary embodiments, the trailing energy beam 17 may form a beam pattern that generally corresponds to the shape of the transition region (e.g., trailing region 32) of the melt pool 20. For example, as shown in FIG. 4, the transition region located between the liquid interface 34 and the solid interface 36 typically has a generally concave shape that opens toward the leading region 30, because the lateral edges of the melt pool 20 may cool faster than the center. Accordingly, in some exemplary embodiments, the trailing energy beam pattern 17a may be configured in a concave pattern with the concave side toward the leading region 30 of the melt pool (as shown in FIG. 4, for example), which may enhance the disruption of dendritic structures and/or promote redistribution of liquid melt. As shown, the apex of the concave pattern may be positioned at a centerline of the trailing region 32 in the travel direction. The trailing energy beam pattern 17a may have a lateral width that is at least as wide, or wider, than a lateral width of the trailing region 32, where the respective lateral widths are taken in a direction orthogonal to the travel direction. In the illustrated embodiment, the trailing energy beam pattern 17a is chevron-shaped, which is found to be effective in reducing hot cracking during the exemplary additive manufacturing process 100. In other embodiments, the trailing energy beam pattern 17a may be configured with an arc-shaped, crescent-shaped, or parabolic-shaped pattern, or other similar concave patterns, including polygonal patterns.

In exemplary embodiments, the trailing energy beam 17 (e.g., the trailing energy beam pattern 17a) may be spaced apart from the leading energy beam 16 (e.g., the leading energy beam pattern 16a) at a fixed distance as the respective energy beams move together in the travel direction. As shown in the illustrated embodiment of FIG. 4, the trailing energy beam pattern 17a may be spaced apart from the leading energy beam pattern 16a at a fixed distance such that the trailing energy beam 17 may be maintained in the transition region containing the solid-liquid phase (e.g., trailing region 32). It is understood that the terms "fixed distance" or "fixed position" when used to describe the positional relationship between the respective energy beams, or respective energy beam patterns, means that the energy beams themselves, or the patterns that are formed by the energy beams, are in such a positional relationship as they impinge the raw material, even though during rastering the emitted beam may move point-to-point to form such beams or such patterns, as understood from the discussion above. It is also understood that although in some embodiments the trailing energy beam pattern may be fixed relative to the leading energy beam pattern, that the position of the trailing energy beam 17 (e.g., trailing energy beam pattern 17a) may be varied relative to the leading energy beam 16 (e.g., leading energy beam pattern 16a) during the additive manufacturing process, as discussed in further detail below with reference to FIG. 5.

Referring again to the flow chart shown in FIG. 3 (with reference to FIGS. 2 and 4), at step 160, as the melt pool 20 sufficiently cools at the rearward edge of the trailing region 32, the solid interface 36 is formed, and the solidified melt pool forms the re-solidified layer 22, or trace, that trails the path taken by the leading energy beam 16, leading region 30, and trailing region 32 along the x-y plane. At step 170, these re-solidified layers 22 are deposited adjacent to each other along the x-y plane, and/or on top of each other along a z-axis that is orthogonal to the x-y plane, so as to build the three-dimensional article re-solidified layer by re-solidified layer. As such, at step 180, the process may repeat a number of times until the three-dimension article is formed to a desired level of completion.

In exemplary embodiments, one or more of the parameters of the exemplary process 100 may be optimized to reduce hot cracking. By way of example, and not limitation, one or more of the following parameters may be varied in an EBAM process for optimization: wire feed rate, total emitted beam power, and power distribution between the leading energy beam and the trailing energy beam. In this example, the wire feed rate is the rate at which the raw material wire is fed to the feed region; the total emitted beam power is the total power level of the emitted electron beam from the source, which is translated through a raster pattern to define the leading energy beam and the trailing energy beam; and the power distribution is the split of the total power level between the leading energy beam and the trailing energy beam. By way of example, and not limitation, one or more of the following parameters may be constant during optimization of the EBAM process: travel speed (e.g., relative speed between the EB gun and substrate), accelerating voltage of the electron beam, wire diameter, wire composition, size of the deposited specimens, and interpass temperature. By way of example, and not limitation, one or more of the following observations may be made: visual inspection of external segregation defects (e.g., macro-cracking), mechanical testing (e.g., tensile and hardness testing), radiographic inspection of internal segregation defects (e.g., internal porosity), and compositional analysis of the deposited and re-solidified raw material (e.g., spark emission spectroscopy).

In one example of an optimization experiment, the following constant parameters are used to additively manufacture test specimens: (i) the travel speed is about 15 inches per minute, (ii) the accelerating voltage is about 30 kV, (iii) the wire diameter is about 0.125 inches, (iv) the wire composition is 6061 aluminum alloy, (v) the vacuum level is less than about 100 microtorr (vi) the leading energy beam pattern is a series of nine concentric circles, (vii) the trailing energy beam pattern is chevron-shaped, (viii) the trailing energy beam pattern is directed at the trailing region of the melt pool, and is at a fixed distance relative to the leading energy beam pattern, (ix) the interpass temperature is less than about 30 degrees Celsius, and (x) the size of the deposited specimen is about 8 in.×0.75 in.×2 inch. Based on visual and radiographic observations for segregation defects (e.g., cracking and porosity) and mechanical testing (e.g., tensile testing) of the specimens, the results of the optimization experiment indicate that one or more of following parameters may be optimal for electron beam additively manufacturing the aluminum 6061 alloy: (i) the total power level is in the range of about 1 kW to about 10 kW, more particularly in the range of about 2 kW to about 5 kW (with a beam current in the range of about 80 mA to about 143 mA, for example), (ii) the distribution of the total power level is split between the leading energy beam (L) and the trailing energy beam (T) by a ratio in the range of about 85:15 (L:T) to about 99:1 (L:T), and (iii) the wire feed rate is in the range of about 30 inches per minute to about 55 inches per minute. More particularly, the results of the optimization experiment indicate that the following parameters of the EBAM process create specimens that have the fewest cracks and porosity by visual and radiographic observation, and have the highest tensile strength results: (i) the total power level is in the range of about 2 kW to about 3 kW, more particularly about 2.7 kW, (ii) the distribution of the total power level is split between the leading energy beam (L) and the trailing energy beam (T) by a ratio of about 95:5 (L:T), and (iii) the wire feed rate is about 40 inches per minute.

Also based on the above-described optimization experiment, the results of compositional analysis (e.g., spark emission spectroscopy) of the fabricated Al 6061 specimens indicate that the weight percentage of magnesium and zinc are reduced during the EBAM process. In the Al 6061 alloy, magnesium is an alloying agent that contributes to strength of the alloy, particularly during subsequent heat treatment. Zinc may be a tramp element found in the aluminum alloy (e.g., not added for performance), but its loss during the EBAM process may contribute to porosity of the solidified specimen, which may thus reduce strength. These alloying agents (e.g., Mg) or tramp elements (e.g., Zn) each have an intrinsic vapor pressure that varies with temperature. For example, during the EBAM process, the processing temperature of the Al 6061 alloy is beyond its melting point (so as to form the melt pool), which may be in the range of about 580 degrees Celsius (solidus) to about 652 degrees Celsius (liquidus). At this processing temperature, the vapor pressure of magnesium is typically greater than 100 microtorr (e.g., the vapor pressure of magnesium at 652 degrees Celsius is about 3.4 torr). However, the pressure level in the EBAM chamber during additive manufacturing is traditionally set to below 100 microtorr. Thus, during EBAM processing of the Al 6061 alloy, the elevated processing temperature (e.g., 580 degrees Celsius to about 652 degrees Celsius) in the low pressure environment (e.g., below 100 microtorr) may contribute to vaporization of elements in the aluminum 6061 alloy, such as magnesium and zinc.

In exemplary embodiments, the vacuum level used during an exemplary additive manufacturing process may be decreased compared to traditional EBAM processing parameters, bringing the pressure level closer to atmospheric pressure (but still below atmospheric pressure) so as to prevent or reduce vaporization of one or more alloying agents during the additive manufacturing process, which may thereby reduce hot cracking and/or reduce internal porosity in the additively manufactured article. For example, where the raw material is a metal alloy having one or more alloying agents that contribute to increasing strength of the metal alloy, then the vacuum chamber may be set to a pressure level during the additive manufacturing process that is closer to, equal to, or greater than the vapor pressure of the one or more alloying agents at the processing temperature to reduce vaporization thereof. It is understood, however, that some additive manufacturing processes may be limited to a maximum pressure level in the vacuum chamber based on limitations of the additive manufacturing process/apparatus. For example, during an EBAM process, increasing the pressure level to greater than 3,000 microtorr may affect electron beam characteristics (e.g., increased attenuation of the electron beam caused by a scattering effect of the atmosphere in the chamber), or may affect EB gun discharging (e.g., metal vapor or positive ions entering the EB gun and causing electric arcs that may lead to breakdown or interruption during the process). As such, although it would be advantageous to reach or exceed the vapor pressure of the alloying agent at the processing temperature (e.g., 3.4 torr for preventing vaporization of magnesium as discussed above), such elevated pressure levels may not be practical for some additive manufacturing apparatus (e.g., EBAM apparatus), but may be practical for other apparatus (e.g., laser-based additive manufacturing apparatus, for example). In any case, it may be beneficial to increase the pressure level in the vacuum chamber to about 500 microtorr or greater for reducing vaporization of alloying agents at the processing temperature, for example about 600, 700, 800, 900, 1000, 1250, 1500, 1750, 2000, 2250, 2500, 2750, 3000 microtorr, or more, including all ranges and subranges therebetween. Additionally, the vacuum chamber may be back-filled with an inert gas, such as helium By way of example, and not limitation, an experiment is conducted that increases the pressure level of the vacuum chamber (closer to atmospheric pressure) during an exemplary EBAM process when compared to a traditional EBAM process that uses a chamber pressure of less than 100 microtorr. In the example, the exemplary EBAM process is used to fabricate Al 6061 (having at least Mg as an alloying agent), and the processing temperature of the raw material is in the range of about 580 degrees Celsius to about 652 degrees Celsius. In the example, the pressure level of the chamber is set to about 500 microtorr or greater. More particularly, so as to reduce the likelihood of discharging of the EB gun, the pressure level in the vacuum chamber is in the range of about 500 microtorr to about 3,000 microtorr. More particularly, so as to further reduce vaporization of the alloying agent(s), the pressure level in the vacuum chamber is in the range of about 1,000 microtorr to about 3,000 microtorr, or more particularly in the range of about 2,000 microtorr to about 3,000 microtorr. Additionally, the vacuum chamber is back-filled with helium. The results of this experiment indicate that such an exemplary process is effective to reduce vaporization of alloying agents, such as magnesium, which reduces porosity and improves compositional control of the additively manufactured specimens.

As discussed above with reference to FIG. 4, in some embodiments the trailing energy beam 17 (e.g., trailing energy beam pattern 17a) may be fixed relative to the leading energy beam 16 (e.g., leading energy beam pattern 16a); however, it is understood that in other exemplary embodiments it may be advantageous for the trailing energy beam 17 (e.g., the trailing energy beam pattern 17a) to instead be dynamically adjusted during the additive manufacturing process 100. Such dynamic adjustment of the trailing energy beam 17 may enhance agitation of the melt pool 20 at the trailing region 32 by promoting convective currents or turbulence from pulsing electromagnetic fields in the melt pool which may provide a stirring effect. Such a process may disrupt dendritic structures and encourage a more equiaxed grain structure in the trailing region 32, and/or may enhance redistribution of liquid melt from the leading region 30 toward the trailing region 32 so as to replenish lost volume caused by shrinkage as the melt pool solidifies. This may reduce hot cracking, reduce internal porosity, and/or improve strength and ductility in the additively manufactured article.

In exemplary embodiments, the trailing energy beam 17 (e.g., the trailing energy beam pattern 17a) may be dynamically altered by varying the distance from the leading energy beam 16 (e.g., the leading energy beam pattern 16a) as the leading energy beam moves in the travel direction. For example, the trailing energy beam 17 may move back and forth in the melt pool 20 between a first position (e.g., that is closer to the leading energy beam 16, such as at or near the region of the liquid interface 34) and a second position (e.g., that is further from the leading energy beam 16, such as at or near the region of the solid interface 36); and/or may move to one or more intermediate positions between the first position and the second position. Alternatively or additionally, the trailing energy beam 17 may cycle between two or more positions located at varying distances from the leading energy beam 16. Alternatively or additionally, the trailing energy beam 17 may move in various other directions, such as side-to-side (e.g., laterally in a direction orthogonal to the travel direction), or may rock back and forth about a pivot point, for example. Such dynamic movement(s) of the trailing energy beam 17 may locally heat different regions of the melt pool causing density gradients that may promote convective or turbulent stirring, and/or which may enhance agitation by pulsing electromagnetic fields at the different regions. In exemplary embodiments, the trailing energy beam may alternate between several positions in such a way to promote movement of liquid melt in the direction opposite the general travel direction so as to encourage movement of fresh melt toward the solidifying regions of the melt pool (e.g., toward the rearward (solid) interface 36) in order to replenish material as shrinkage and contractions occur.

Figure 5:
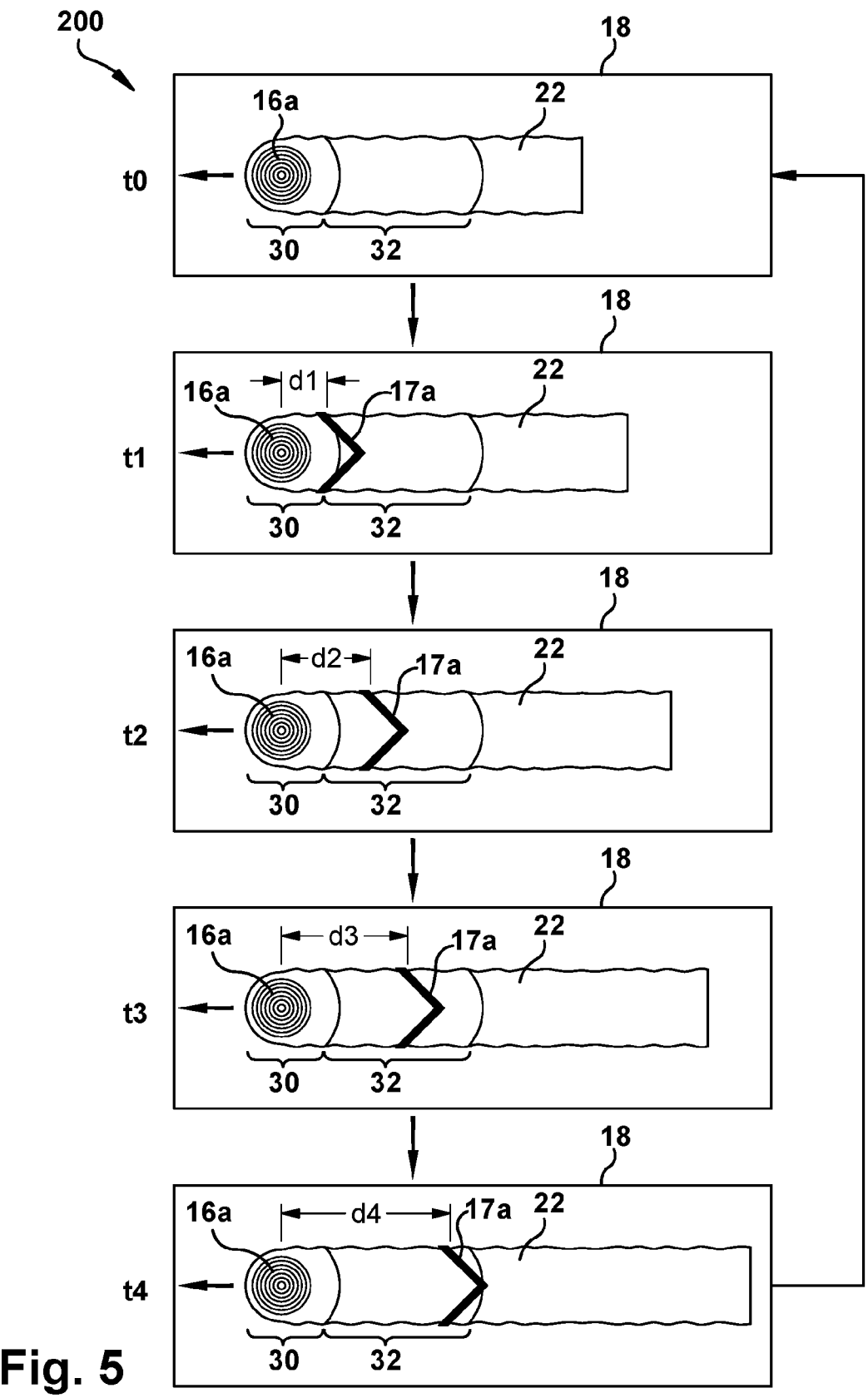
FIG. 5 in a schematic plan view illustrating another exemplary process of additive manufacturing according to an embodiment of the invention.

FIG. 5 illustrates an exemplary method 200 of dynamically altering the position of the trailing energy beam 17 (e.g., the trailing energy beam pattern 17a) relative to the leading energy beam 16 (e.g., the leading energy beam pattern 16a) during a manufacturing process. It is understood that this method 200 may be incorporated into the method 100 described above, such as at step 150. As shown in FIG. 5, the trailing energy beam pattern 17a may be spaced from the leading energy beam pattern 16a at progressively increasing distances (d1-d4) for each time interval (t1-t4), and then may cycle back through each interval. In this example, the general direction of each progressively increasing distance is from the leading region 30 toward the trailing region 32, which may encourage the liquid melt in the leading region 30 to move rearward toward the solidifying portions of the trailing region 32 (e.g., toward the rearward (solid) interface 36 of the trailing region). The trailing energy beam 17a may dwell for a period of time at each interval (t1-t4) so as to produce a density gradient in the melt pool that may enhance movement and inertia of the liquid metal, which may promote stirring and/or encourage liquid metal to redistribute toward the solidifying regions. Optionally, the trailing energy beam pattern 17a may be deactivated at one or more of the time intervals, such that only the leading energy beam pattern 16a is utilized. It is understood that at each time interval shown, the leading energy beam 16a and subsequent formation of the melt pool moves along the substrate 18 in the travel direction (shown with arrows), such that the re-solidified layer increases in size at each time interval (as shown).

By way of example, and not limitation, an experiment is conducted that utilizes the method 200 for electron beam additive manufacturing of aluminum alloy 6061. In the example, an electron beam gun emits an electron beam, which is translated through a raster pattern to form the leading energy beam pattern 16a and the trailing energy beam pattern 17a. In the example, the electron beam gun scans at a rate of 400 Hz, and the series of patterns (t0-t4) is repeated every 100 cycles. At t0 (scans 1-20), the trailing energy beam pattern 17a is deactivated and only the leading energy beam pattern is utilized. At t1 (scans 21-40), the trailing energy beam pattern 17a is spaced by a first distance d1, which is one-fourth of a maximum distance as represented by second distance d4 (shown at t4). It is understood that the maximum distance as used herein is not necessarily a maximum possible distance, but is an arbitrary designation of the maximum amount the beams are spaced apart during this process. At t2 (scans 41-60), the trailing energy beam pattern 17a is spaced by a first intermediate distance d2 between d1 and d4, where the distance d2 is at half of the maximum distance d4. At t3, (scans 61-80), the trailing energy beam pattern 17a is spaced by a second intermediate distance d3, which is at three-fourth of the maximum distance d4. At t4 (scans 81-100), the trailing energy beam pattern 17a is spaced at the maximum distance d4. This process then repeats for the desired number of cycles as the layer 22 is formed. The results of this experiment indicate that the process 200 is effective to further reduce porosity, further increase strength (e.g., ultimate tensile strength), and further increase ductility of the additively manufactured specimen when compared to a similar EBAM process that uses the trailing energy beam at a fixed distance as discussed above. The results also indicate that such a dynamic trailing energy beam may be effective to reduce volatilization of alloying agents, such as magnesium, which may be due to the stirring effect.

It is understood in the foregoing discussion that the term "varying distances" or "varying positions," or such similar terms used to describe positional relationships between the respective energy beams, or respective energy beam patterns, means that the energy beams themselves, or the patterns that are formed by the energy beams, are in such positional relationships as they impinge the raw material, understanding that during a rastering method the emitted beam may already be moving point-to-point to form such beams or such patterns. It is further understood that the advantages provided by the dynamic alteration(s) of the trailing energy beam as discussed above are not limited to the trailing energy beam being configured in a concave pattern as shown, but rather it is contemplated that advantages may be realized using various other trailing energy beam patterns, such as circular, concentric circles, elliptical, polygonal, etc. It is also understood that varying the position of the trailing energy beam may be one of many different ways to dynamically alter the trailing energy beam to enhance agitation/redistribution in the melt pool, and other such methods of dynamic alteration may include one or more of: varying the intensity of the trailing energy beam (e.g., the energy level or power density), varying the pattern of the trailing energy beam, and other similar dynamic variations.

Figure 6:
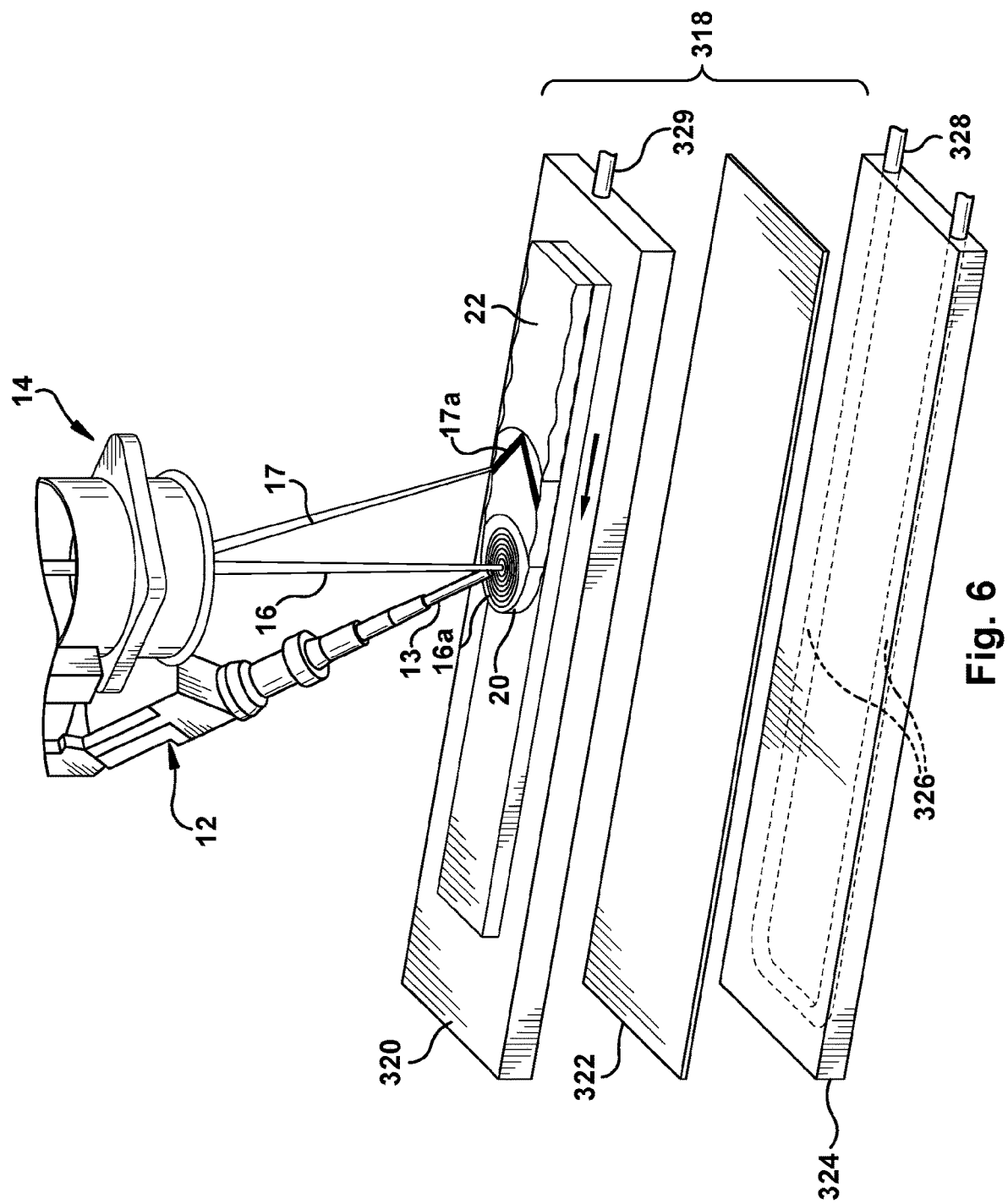
FIG. 6 is an enlarged schematic view of an exemplary work piece support with chill plate according to an embodiment of the invention, which may be utilized in the additive manufacturing apparatus in FIG. 1.

Turning to FIG. 6, another exemplary embodiment of a work piece support 318 for the exemplary EBAM apparatus 10 is shown. The work piece support 318 is substantially similar to the above-referenced work piece support 18, and consequently the foregoing description of the work piece support 18 is equally applicable to the work piece support 318, except as noted below.

The work piece support 318 may form a substrate for supporting the liquefied raw material as a molten pool deposit 20, either directly or indirectly via the one or more re-solidified layers 22. In this manner, the substrate formed by the work piece support 318 provides a heat transfer medium for extracting heat from the molten pool deposit 20, or from the re-solidified layers 22, or both. Because the EBAM process typically occurs under vacuum, there is no convective heat transfer available to cool the melt pool 20, re-solidified layers 22, or substrate (e.g., substrate support 320), and thus heat may uncontrollably accumulate in the substrate. This accumulation of heat in the substrate may affect the interpass temperature, which is the temperature of the substrate in the feed region just before a subsequent molten pool deposit is made. The interpass temperature may affect the characteristics of the molten pool deposit 20 and/or the re-solidified layer 22, and thus it may be advantageous to control the interpass temperature.

As shown in the illustrated embodiment, the work piece support 318 includes a chill plate 324, which is operatively coupled in thermal communication with the substrate support 320. A compressible thermally conductive material 322 may be interposed between the chill plate 324 and the substrate support 320. The thermally conductive material 322 may be Grafoil (self-adhering graphite particles) manufactured by Graftech International of Parma, Ohio. The compressible thermally conductive material (e.g., Grafoil) may minimize gaps between the substrate support 320 and the chill plate 314, for example, to less than 25 microns so as to enhance conductive heat transfer between the components. As shown, the chill plate 324 may include fluid passages 326, which may be fluidly coupled via fluid conduits 328 to a source of chilled fluid, such as water, for actively and continuously cooling the chill plate 324 as the chill plate extracts heat from the substrate support 320. One or more sensors 329, such as a thermocouple, may be embedded in one or more of the regions of the work piece support 318 to monitor temperature, and the active cooling of the chill plate 324 may be controlled, such as by the control system 20, in response to the measured temperature. In this manner, the chill plate 324 may be configured to maintain a relatively constant interpass temperature of the substrate during the EBAM process, such as at about 200, 100, or 65 degrees Celsius or less, for example.

Generally, the exemplary method of additive manufacturing as described hereinabove may be used to form a three-dimensional article, preferably made from a metal or metal alloy, where the method of additive manufacturing may include layer-by-layer manufacturing process. The article may be an aircraft component, a rocket component, a marine component, a spacecraft component, an automotive vehicle component, a turbine component, a radar component, or component capable of functioning in any similar application. The exemplary process may enable near net shape of parts at least as large as 4 ft.×4 ft.×19 ft., or larger. The exemplary process may reduce machining time, may decrease turnaround time, may enable larger structures to be made into smaller modular structures, may reduce costs, and may produce parts that are fully-annealed through the e.g., EBAM process, which may be less susceptible to warpage after the process. For example, in a case study for an airborne mine neutralization system (AMNS) by Raytheon Company. that uses an Al 6061 structure that is about 10 feet in length, the exemplary additive manufacturing process described above may realize a 57% cost savings in machining compared to conventional forming of the AMNS, may provide a 97% reduction in material removed, and may realize a 62% savings in machining time.

It is understood that the exemplary additive manufacturing process(es) (e.g., 100, 200, etc.) described above also may be utilized in a method that uses an additive manufacturing technique to repair features on an existing article (also referred to as a "repair process"). Such a repair process may be advantageous because components which are damaged may require lengthy and time consuming rework or complete re-manufacture. Traditional manufacturing methods are commonly subtractive in nature, and an additive manufacturing technique would be advantageous to restore damaged existing components to functional condition. The exemplary repair process may involve depositing the raw material onto the already-fabricated and damaged component, instead of on the substrate. For example, the component may be built up with additional material to restore the damaged/missing features. Candidate parts may include errors during initial manufacture, damage during integration or transport, or damage to in-service hardware. The added material from the exemplary repair process may be of a similar or different material from the original component. The composition of the added material can be tailored to instill unique qualities. For example, the added material could be composed of a more corrosion resistant, higher strength, a more wear resistant material, a more thermally or electrically conductive material, or other property. Optionally, before adding the material, the surface to be repaired may be prepared. Optionally, after adding the material, conventional machining may be used to achieve final features.

It is understood that the exemplary additive manufacturing process(es) (e.g., 100, 200, etc.) described above also may be utilized in a method that uses an additive manufacturing technique to tailor the properties of an already existing article (also referred to as a "tailoring process"). In the tailoring process, the added material from an additive manufacturing process may be tailored to provide unique qualities to the existing article. For example, the added material to the existing article could be composed of a material that is more corrosion resistant, higher strength, more wear resistant material, more thermally or electrically conductive, or other property.

It is understood that the exemplary additive manufacturing process(es) (e.g., 100, 200, etc.) described above also may be utilized in a method that uses an additive manufacturing technique that uses a "hybrid" or combined approach to additive manufacturing (also referred to as the "hybrid electron beam additive manufacturing process", or "hybrid process," or "HEBAM"). For example, the hybrid process may use preexisting, prefabricated features or articles of the desired object that are either not practicable with traditional additive manufacturing processes, or would require substantial time and deposited material to achieve similar results. Such a hybrid process may be advantageous because electron beam additive manufacturing is typically accomplished to layer manufacturing where one layer of material is deposited on a substrate and one or more additional layers are added to the first layer, which could be relatively time consuming to create the desired article. Sometimes the article from such techniques is not in the finished configuration requiring additional processing to achieve final results. In addition, certain shapes may not be possible by continuous layering of materials, since the deposit time and cost of deposit materials may be expensive. The exemplary hybrid process may use the exemplary additive manufacturing approach discussed above, or even a traditional EBAM approach, to combine a prefabricated article with another article, including the steps of: fabricating the prefabricated article; forming the other article using an additive manufacturing process, for example EBAM; and combining the prefabricated article with the other article by using the additive manufacturing process. During the exemplary hybrid process, one or more prefabricated articles may be introduced into the process. The prefabricated articles may be woven into the process so that sequential layers of additive manufacturing incorporate the prefabricated article into the object being produced. During the process, a robotic manipulator may be used to place the prefabricated article in the desired location to be incorporated or combined with the additive manufacturing process. The prefabricated article may be chosen due to its unique properties. For example, the prefabricated article may have unique thermal transfer, wear resistance, corrosion resistance, strength, or other property. The prefabricated article may be chosen due to its unique geometry not practicable with traditional AM, such as EBAM. For example, the prefabricated article may have one or more of the following features: threading, sealing surfaces, sliding interfaces, thermal interfaces, small and complex features, internal cavities, coolant channels, hydraulic channels, wiring conduits, bores, passages, electronics, sensors, and/or ballistic surfaces. The HEBAM process may be unique from EBAM in that it speeds the layer by layer approach allowing the process to proceed more efficiently saving time, material and energy costs. Furthermore the prefabricated article may be designed to create unique geometry, and or properties complimenting the material being deposited.

It is understood that although the exemplary repair process, the exemplary tailoring process, and/or the exemplary hybrid process may utilize the aforementioned exemplary additive manufacturing process(es) described above (e.g., 100, 200, etc.), they are not limited thereto, and instead may use any additive manufacturing process, including direct energy deposition techniques, powder bed fusion techniques, fused-filament fabrication techniques, and others.

As discussed above, it is understood that although the present specification discloses certain exemplary embodiments that have particular application to electron beam additive manufacturing (EBAM) of aluminum alloys, the exemplary additive manufacturing process(es) described above (e.g., 100, 200, etc.) are not limited thereto, and may be applicable to other fusion processes, including other additive manufacturing processes. For example, the exemplary additive manufacturing process(es) described above (e.g., 100, 200, etc.) may be equally applicable to other additive manufacturing techniques, such as direct energy deposition AM processes, including direct metal deposition, laser deposition wire, laser deposition powder, laser consolidation, laser engineering net shape, electron beam direct melting; powder bed fusion AM processes, including direct metal laser sintering, selective laser sintering, selective laser melting, electron beam melting; and other fusion processes, for example those in which a melt pool is produced and solidified.

By way of example, and not limitation, the exemplary additive manufacturing process(es) described above (e.g., 100, 200, etc.) may be used for Selective Laser Sintering (SLS) and Selective Laser Melting (SLM), which are laser-based AM processes that utilized powdered materials. The laser (energy beam) is traced along an x-y plane across a powder bed (raw material) of evenly spread material laid down by a leveler or roller on a build tray. As the laser interacts with the surface of the powdered material, the powder particulates melt to form a melt pool that enables the particles to fuse together to form a solid. During this process, a trailing laser (energy beam) may follow the leading (primary) energy beam, and may be directed toward a trailing region of the melt pool. The leading laser beam and/or trailing laser beam may have each have a pattern, and may be spaced apart at a fixed distance, or variable distance, among other factors described above. As each layer is completed, the powder bed drops incrementally and a roller smooths the powder over the surface of the bed prior to the next pass of the laser for the subsequent layer to be formed and fused with the previous layer. In these processes, the build chamber may be sealed to maintain an inert gas environment to shield the melting powder from oxygen contamination. Once finished, the excess powder is removed, leaving the final additively manufactured part. One advantage of this process is that the powder bed serves as an in-process support structure for overhangs and undercuts, and, therefore, complex shapes with high geometrical accuracy can be manufactured with this type of process.

By way of example, and not limitation, the exemplary additive manufacturing process(es) described above (e.g., 100, 200, etc.) may be used for Electron Beam Melting (EBM), which is another powder bed fusion technique similar to SLM/SLS. The difference is the heat source or energy beam, which in the EBM process uses an electron beam, rather than a laser. Thus, the process is carried out under vacuum conditions. A heated tungsten filament emits electrons which are collimated and accelerated to form the electron beam (energy beam). The electron beam is controlled by two magnetic coils. The first coil is a magnetic lens which focuses the beam, and the second coil assembly deflects the focused beam to a desired point on the build platform. The emitted electron beam may be translated through a raster pattern to form a leading energy beam and a trailing energy beam as described above. In a chamber, a metal powder bed (raw material) is formed with a raking mechanism. The computer-controlled electron beam scans over the powder bed to melt the powder and form a melt pool in a predefined pattern. During this process, a trailing electron beam (energy beam) may be directed toward a trailing region of the melt pool. The leading electron beam and/or trailing electron beam may each have a pattern, and may be spaced apart at a fixed distance, or variable distance, among other factors described above. After the melt pool solidifies, then a new powder layer is laid on top of the solidified/scanned material and the process is repeated until all layers are completed.

By way of example, and not limitation, the exemplary additive manufacturing process(es) described above (e.g., 100, 200, etc.) may be used for powder-fed systems, such as Laser Metal Deposition (LMD) and Laser Engineered Net Shaping (LENS). In LMD/LENS, a powder (raw material) is blown through a nozzle and directed at a feed region. The powder is then melted by a laser beam (energy beam) to form a melt pool that is deposited on a substrate or already-solidified layer. During this process, a trailing laser (energy beam) may follow the leading (primary) energy beam, and may be directed toward a trailing region of the melt pool. The leading laser beam and/or trailing laser beam may have each have a pattern, and may be spaced apart at a fixed distance, or variable distance, among other factors described above. The melt pool then solidifies to form the re-solidified layer, and the process repeats. This LMD/LENS process(es) are typically precise and may be based on an automated deposition of a layer of material with a thickness varying between 0.1 mm and a few millimeters. The metallurgical bonding of the cladding material with the base material and the absence of undercutting are some features of this process.

By way of example, and not limitation, the exemplary additive manufacturing process(es) described above (e.g., 100, 200, etc.) may be used for laser-based wire feed systems, such as wire Laser Metal Deposition (LMD-wire). In LMD-wire, a feed wire (raw material) is passed through a nozzle toward a feed region, whereby the metal wire is melted by a laser (energy beam) to form a melt pool that is deposited on a substrate or previously solidified layer. During this process, a trailing laser (energy beam) may follow the leading (primary) laser beam, and may be directed toward a trailing region of the melt pool. The leading laser beam and/or trailing laser beam may have each have a pattern, and may be spaced apart at a fixed distance, or variable distance, among other factors described above. The LMD-wire process may incorporate inert environment shielding in either an open environment (inert gas surrounding the laser), or in a sealed gas enclosure. This process typically provides higher deposition rates as compared with powder bed and blown powder direct energy deposition.

The foregoing list of alternative processes that may use the exemplary additive manufacturing process(es) (e.g., 100, 200, etc.) is intended to be illustrative, and not limiting. It is also understood that one or more features of the exemplary additive manufacturing process(es) described above may be used in other manufacturing processes, for example other fusion processes, such as other additive manufacturing processes or welding, or various other processes, where desirable to (i) prevent hot cracking and/or reduce porosity of the manufactured article; (ii) enhance the characteristics of the manufactured article, such as material strength, material composition, material heat treatability, stress-relieving or annealing, tailorability and flexibility in design or repair; (iii) improve control over the manufacturing process parameters, such as cooling rates or maintaining processing temperatures; (iv) among various other considerations discussed above.

It is understood that although the present specification discloses certain exemplary embodiments that have particular application to processing of aluminum alloys, such as Al 6061, the exemplary additive manufacturing process(es) described above (e.g., 100, 200, etc.), and the various alternatives, are not limited thereto, and may be applicable to other materials. For example, other materials may include one or more metals, metal alloys, or non-metals. The metal or alloy may include: titanium or titanium alloys, nickel or nickel alloys, Inconel, tantalum, tungsten, niobium, stainless steels, austenitic steels, aluminum or aluminum alloys. Other similar metal or metal alloys; or other metal or metal alloys which may be susceptible to hot cracking also may be used.

It is understood that embodiments of the subject matter described in this specification can be implemented in combination with digital electronic circuitry, controllers, processors, computer software, firmware, and/or hardware. For example, embodiments may be implemented in an additive manufacturing system that uses one or more modules of computer program instructions encoded on a non-transitory computer-readable medium for execution by, or to control the operation of, data processing apparatus. In the flow diagram(s), blocks may denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of them. The controller may include all apparatus, devices, and machines for processing data, including by way of example a programmable processor, a computer, or multiple processors or computers. The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network. The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry. To provide for interaction with a user, embodiments may be implemented using a computer having a display device and an input device. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

One or more methods and apparatuses, particularly for additively manufacturing materials that are susceptible to hot cracking, have been described herein. As discussed, the additive manufacturing process may include a leading energy beam for liquefying a raw material to form a melt pool, and a trailing energy beam directed toward a trailing region of the melt pool. The trailing energy beam may be configured to enhance agitation and/or redistribution of liquid in the melt pool to prevent hot cracking, reduce porosity, or improve other characteristics of the solidified part. The method and apparatus also may improve processing parameters, such as adjusting vacuum level to prevent volatilization of alloying agents, or providing a chill plate to control interpass temperature. The process may be used to form new articles, and also may be used to enhance tailorability and flexibility in design or repair of pre-existing articles, among other considerations.

According to an aspect of the invention, a method of additive manufacturing is provided that includes: providing a raw material in solid state form; exposing the raw material to a leading energy beam thereby liquefying the raw material; forming a melt pool with the liquefied raw material, where the melt pool has a leading region and a trailing region; and exposing the trailing region of the melt pool to a trailing energy beam.

According to an aspect of the invention, a method of fusion processing is provided that includes: providing a raw material in solid state form; exposing the raw material to a leading energy beam thereby liquefying the raw material; forming a melt pool with the liquefied raw material, the melt pool having a leading region and a trailing region; and exposing the trailing region of the melt pool to a trailing energy beam; wherein the trailing energy beam is configured in a concave pattern that opens toward the leading region of the melt pool.

According to an aspect of the invention, a method of fusion processing is provided that includes: providing a raw material in solid state form; exposing the raw material to a leading energy beam thereby liquefying the raw material; forming a melt pool with the liquefied raw material, the melt pool having a leading region and a trailing region; and exposing the trailing region of the melt pool to a trailing energy beam; wherein the trailing energy beam is spaced apart from [[follows]] the leading energy beam at varying distances as the leading energy beam moves in a travel direction.

According to an aspect of the invention, a method of fusion processing is provided that includes: providing a metal alloy in solid state form, the metal alloy having at least one alloying agent; and exposing the metal alloy to an energy beam thereby heating the metal alloy to a processing temperature that is beyond the melting point of the metal alloy; wherein the additive manufacturing process is conducted in a vacuum chamber; and wherein a pressure level of the vacuum chamber is 500 microtorr or greater for reducing vaporization of the at least one alloying agent at the processing temperature.

According to an aspect of the invention, an additive manufacturing apparatus for layer-by-layer manufacturing of a three-dimensional article, the additive manufacturing apparatus including: a material delivery device configured to feed a raw material in a solid state form to a feed region; an energy source configured to emit an energy beam directed at the feed region for liquefying the raw material; a substrate for supporting the liquefied raw material as a molten pool deposit, the substrate providing a heat transfer medium for extracting heat from the molten pool deposit; and a chill plate in thermal communication with the substrate.

According to an aspect of the invention, a method of additive manufacturing is provided that includes: exposing a material (such as a raw material) to a primary energy beam (or leading energy beam) to liquefy the material; using a trailing energy beam (or secondary energy beam) following the primary energy beam or following the liquefied material.

According to an aspect of the invention, a method of additive manufacturing, including: using a patterned energy beam.

According to an aspect of the invention, a method of additive manufacturing, including: exposing a raw material to a primary energy beam (or leading energy beam) to liquefy the raw material; forming a molten pool having a forward region and a trailing region; and exposing the trailing region to a trailing energy beam.

According to an aspect of the invention, a method of additive manufacturing, including: a) feeding a raw material in solid state form to a first predetermined location; b) exposing the raw material to a primary energy beam (or leading energy beam) to liquefy the raw material; c) depositing the liquefied material onto a substrate as a molten pool deposit, the molten pool deposit having a forward region and a trailing region; d) solidifying the molten pool deposit; wherein: e) after step c) and before step d), the method further includes exposing the trailing region of the molten pool deposit (or the trailing region of a deposit that is in a state of cooling) to a trailing energy beam; or f) after step d), the method further includes exposing the solidified deposit to a trailing energy beam; or g) the method further includes both steps e) and f).

According to an aspect of the invention, a method of additive manufacturing, including: delivering a feed material (such as a raw material) in a substantially solid state form into a feed region; emitting an energy beam having one or more predetermined electrical currents; translating the energy beam through a first raster pattern and a second raster pattern in an x-y plane; wherein the first raster pattern includes a leading pattern within the feed region sufficient so that the feed material is subjected to a primary (or leading) beam power density level sufficient to cause melting of the feed material and formation of a molten pool deposit having a forward region and a trailing region; wherein the second raster pattern includes a trailing pattern within a trailing region following the feed region, the trailing pattern being sufficient so that the material in the trailing region is subjected to a trailing beam power density level that is sufficient to prevent hot cracking of the molten pool deposit during solidification; or to break up dendritic structures in the trailing region of the molten pool deposit; or to reheat already-solidified material from the solidification of the molten pool deposit; or to stress relieve or anneal the already-solidified material; optionally, wherein the trailing beam power density level is different from the melting beam power density level; and optionally, wherein the leading pattern is different from the trailing pattern.

Embodiments of the invention may include one or more of the following features alone or in combination.

The method of additive manufacturing may be used to form a three-dimensional article.

The raw material or the feed material may be a metal or metal alloy; or wherein the three-dimensional article may be made from a metal or metal alloy.

The method of additive manufacturing may include layer-by-layer manufacturing of a three-dimensional work piece.

The method of additive manufacturing is selected from the group consisting of: i) direct energy deposition, including direct metal deposition, laser deposition wire, laser deposition powder, laser consolidation, laser engineering net shape, electron beam direct melting; ii) powder bed fusion, including direct metal laser sintering, selective laser sintering, selective laser melting, electron beam melting; and iii) other methods in which a melt pool is produced and solidified.

The raw material or feed material may be a powder or wire.

The primary (leading) energy and/or the secondary (trailing) energy beam may be an electron beam or a laser beam.

The patterned energy beam may include a leading pattern and a trailing pattern.

The patterned energy beam may be a split beam pattern including a leading energy beam pattern and a separate and individual trailing energy beam pattern.

The primary or leading energy beam may be rastered to form a leading raster pattern, and wherein the secondary trailing energy beam may be rastered to form a trailing raster pattern.

The primary or leading energy beam may be from the same source as the secondary or trailing energy beam.

The emitted energy from the source may be translated through a raster pattern including a leading pattern defined by the leading energy beam, and including a trailing pattern defined by the trailing energy beam.

The leading energy beam and the trailing energy beam may be from the same source that emits the respective beams at one or more predetermined electrical currents.

The primary or leading energy beam may be from a different source from the secondary or trailing energy beam.

The trailing energy beam may have a power level, power density, and/or beam pattern sufficient to prevent hot cracking as the melt pool solidifies.

The trailing energy beam may have a power level, power density, and/or beam pattern sufficient to agitate the trailing region of the melt pool.

The trailing energy beam may have a power level, power density, and/or beam pattern sufficient to break-up a dendritic microstructure that has formed in the trailing region of the melt pool.

The trailing energy beam may have a power level, power density, and/or beam pattern sufficient to increase replenishment of the solidifying melt.

The trailing energy beam may have a power level, power density, and/or beam pattern sufficient to re-melt and redistribute solidified constituents.

The trailing energy beam may have a power level, power density, and/or beam pattern sufficient to stress relieve or anneal the solidified material from the solidification of the molten pool.

The trailing energy beam may have a power level, power density, and/or beam pattern that does not necessarily reheat or re-melt material to the degree provided by the leading energy beam.

The trailing energy beam pattern may be at least as wide, or wider, than a width of the melt pool, the width being taken in a direction transverse to the travel direction.

The trailing energy beam pattern may be concave or convex toward the melt pool in the travel direction.

The trailing energy beam pattern may include one or more of chevron shaped, arc-shaped, parabolic-shaped, circular, triangular, or polygonal patterns.

The chevron-shaped or arc-shaped trailing pattern may have its apex centered in the melt pool in the traveling direction.

The chevron-shaped trailing pattern may have two sides that are each angled with respect to a centerline or apex, the angle between the two sides being at about 60 degrees to about 80 degrees, more particularly at about 75 degrees.

The chevron-shaped trailing pattern may have two sides that may be about ⅜ inches in length when the wire diameter is about ⅛" or when the primary energy beam pattern is about 0.25" diameter; or a corresponding relationship between wire diameter and/or primary pattern diameter and the length and/or angle of the chevron-shaped trailing pattern.

The arc-shaped trailing pattern may have an arc length of about 60 degrees to about 120 degrees, particularly at about 90 degrees.

The primary energy beam pattern may be circular or include concentric circles.

The trailing energy beam pattern may be spaced from the leading or primary energy beam pattern in the travel direction.

The trailing energy beam pattern may be sufficiently spaced from the leading or primary energy beam pattern to break-up a dendritic microstructure that has formed in the trailing region of the melt pool; or to increase replenishment of the solidifying melt pool; or to re-heat or re-melt, or redistribute material of the molten pool; or to stress relieve or anneal the solidified material from the solidification of the molten pool.

The trailing energy beam pattern may be spaced from the leading or primary energy beam pattern in the travel direction by about ⅜" when the wire diameter is about ⅛" or when the primary energy beam pattern is about 0.25" diameter; or a corresponding relationship between wire diameter and/or leading pattern diameter and the spacing between the trailing pattern and the leading pattern.

The distribution of total power level (or total power density) of the emitted energy beam may be split between the leading energy beam (L) and the trailing energy beam (T) by about: 60/40 to 95/5 (L/T), and optionally 70/30, 75/25, 80/20, 85/15, 90/10, or more, including all subranges therebetween. Optionally, the split may be 96/4, 97/3, 98/2, or 99/1.

The ratio of power levels (or power densities) between the leading energy beam (L) and the trailing energy beam (T) is about: 60:40 to 95:5 (L:T), and optionally 70:30, 75:25, 80:20, 85:15, 90:10, or more, including all subranges therebetween. Optionally, the split may be 96:4, 97:3, 98:2, or 99:1.

The total power level of the emitted beam may be about 30 kV+30% or −30%, and optionally 20 kV, 25 kV, 30 kV, 35 kV, 40 kV, 45 kV, 50 kV, 55 kV including all subranges therebetween.

The total current of the emitted beam may be about 140 mA+30% or −30%, and optionally 100 mA, 120 mA, 140 mA, 160 mA, 180 mA, including all subranges therebetween.

The power level (or power density) of at least one of the primary energy beam and the leading energy beam may be variable or constant.

The travel speed may be about 15 inches per minute (ipm) +20% or −20%, and optionally 10 ipm, 12 ipm, 15 ipm, 18 ipm, 20 ipm, 25 ipm, 30 ipm, 40 ipm, 60 ipm including all subranges therebetween.

The wire feed rate may be about 43 inches per minute (ipm) +20% or −20%, and optionally 35 ipm, 40 ipm, 45 ipm, 50 ipm, 55 ipm, including all subranges therebetween.

The step of delivering or feeding the feed material or raw material may include advancing a metallic wire at a substantially constant feed rate, a variable feed rate, or both.

Translating of the energy beam, including leading beam and trailing beam, may include deflecting the beam or beams, which may be done with an electromagnetic coil, which may be translated from point to point at a substantially constant clock rate and/or variable clock rate.

The method may further include monitoring a condition of one or more of the melt pool, the feed region, and the trailing region substantially in real time for the occurrence of any deviation from a preselected condition.

The monitoring may use feedback information from the leading energy beam or trailing energy beam, such as from scatter or reflection.

The monitoring may use an imaging system for real time monitoring and feedback to a controller; and/or may use an in-situ temperature sensor for monitoring interpass temperature and feeding the information back to a controller for control of temperature.

The method may further include automatically altering a processing condition based upon information obtained from the monitoring step, such as altering the power level, power density, and/or beam pattern of one or more of the lead energy beam or trailing energy beam, which may be performed by at least one control device that is in electrical signaling communication with the source of the energy beam, such as an electron beam gun; and optionally during the monitoring a detection signal that is transmitted to the at least one control device upon detection of scatter and which is indicative of a characteristic of the scatter, the detection signal information from the signal may compared with a predetermined value, and based upon such comparison the control device issues a control signal to the energy beam generating device.

The feed material may be an aerospace alloy, such as an alloy containing aluminum, particularly wherein aluminum is a major component of the alloy, more particularly wherein the alloy is a 6061 alloy.

The metal or alloy may include: titanium or titanium alloys, nickel or nickel alloys, Inconel, tantalum, tungsten, niobium, stainless steels, austenitic steels, aluminum or aluminum alloys.

The melt pool may be autogenously formed, for example, independently of using a filler material that is substantially different from the feed material.

The process may be carried out under a non-reactive environment, such as inert gas, non-reactive gas, or vacuum.

The energy beam generating device may be translated during work-piece build up relative to a fixed position for the workpiece; or wherein the workpiece may be translated during build up relative to the energy beam generating device.

According to an aspect of the invention, an apparatus may be provided that is configured to perform the method according to any of the preceding features.

The apparatus may be an electron beam additive manufacturing apparatus or a laser beam additive manufacturing apparatus.

The apparatus may include a substrate in thermal communication with a water cooled chill plate.

The apparatus may include a thermally conductive material, such as Grafoil (self-adhering graphite particles), which may be thermally coupled to the chill plate, particularly such that there is no discernable gap (e.g., less than 0.001 inch gap maximum) between the chill plate and the substrate.

The apparatus may be configured to maintain the interpass temperature at 65 degrees Celsius maximum; and optionally the interpass temperature may be maintained at 27 degrees Celsius maximum.

A computer program may be provided that is configured to perform the method steps according to any of the preceding features, particularly, a non-transitory computer readable medium having stored thereon a program configured to perform the method steps according to any of the preceding features.

According to another aspect of the invention, an article may be provided that is made using the method steps according to any of the preceding features, and which may include one or more of the following features alone or in combination.

The article may be an aircraft component, a rocket component, a marine component, a spacecraft component, an automotive vehicle component, a turbine component, a radar component, or component capable of functioning in any similar application, and wherein the article may be made of metal or metal alloy, such as aluminum or an aluminum alloy.

The article preferably does not substantially contain hot cracks, and/or may have a substantially homogenous structure (or microstructure) of the metal or metal alloy used as the raw material, and optionally does not substantially contain a filler material.

According to an aspect of the invention, a method of repairing an article includes using an additive manufacturing process according to the method of any of the preceding features, and which may include one or more of the following features alone or in combination.

The method of repairing an article, wherein the additive manufacturing process may form the material directly onto the surface to be repaired, and optionally preparing the surface to be repaired prior to the additive manufactured repair.

The method of repairing an article, wherein the component to be repaired may be built up with additional material to restore the damaged and/or missing features.

The method of repairing an article, wherein the additional material to restore the damaged and/or missing feature may be made from a material substantially the same as, or different from, the material from the original component.

The method of repairing an article, wherein the composition of the material added to the existing article may be tailored to provide unique qualities to the existing article.

The method of repairing an article, wherein the unique qualities provided to the existing article may at least include: more corrosion resistant, higher strength, improved wear resistance, improved electrical or thermal conductivity.

According to another aspect of the invention, a method of tailoring the properties of an existing article, including using an additive manufacturing process according to the method of any of the preceding features, and which may include one or more of the following features alone or in combination.

The method of tailoring an article, wherein the material added to the existing article by the additive manufacturing process may be made from a material substantially the same as, or different from, the material from the existing article, and particularly where the composition of the material added to the existing article is tailored to provide unique qualities to the existing article, such as more corrosion resistant, higher strength, improved wear resistance, increased thermal or electrical conductivity.

According to another aspect of the invention, an apparatus may be provided that is configured to perform the method of repairing or tailoring an article according to any of the preceding features, and which may be an electron beam additive manufacturing apparatus or a laser beam additive manufacturing apparatus.

According to another aspect of the invention, the repaired or tailored article that is made according to any of the preceding features.

According to another aspect of the invention, a method of combining a prefabricated article with another article, including using an additive manufacturing process according to the method of any of the preceding features.

According to another aspect of the invention, a method of combining a prefabricated article with another article, including: fabricating the prefabricated article; forming the other article using an additive manufacturing process according to the method of any of the preceding features; and combining the prefabricated article with the other article by using a traditional additive manufacturing process and/or an additive manufacturing process according to the method of any of the preceding claims or any of the following claims.

According to another aspect of the invention, a method of combining a prefabricated article with another article, including the steps: fabricating the prefabricated article; forming the other article with a traditional additive manufacturing process; and combining the prefabricated article with the other article by using a traditional additive manufacturing process and/or an additive manufacturing process according to the method of any of the preceding features.

Optionally, during the forming the other article using the additive manufacturing process, one or more of the prefabricated articles may be incorporated into the additive manufacturing process.

Optionally, the prefabricated article may have one or more of the following features: threading, sealing surfaces, sliding interfaces, thermal interfaces, small and complex features, internal cavities, coolant channels, hydraulic channels, wiring conduits, bores, passages, electronics, sensors, and ballistic surfaces.

Optionally, the prefabricated article may have one or more of the following properties which are different from the other article: thermal transfer, wear resistance, corrosion resistance, strength, or similar properties.

Optionally, the method of combining a prefabricated article with another article may include controlling the synchronization between the electric beam generating device and a robot manipulator, where the robotic manipulator may be used to place the prefabricated article in the desired location for the combining or incorporating step.

The method of combining a prefabricated article with another article, wherein the traditional additive manufacturing process may be selected from the group consisting of: direct metal deposition, laser deposition wire, laser deposition powder, laser consolidation, laser engineering net shape, electron beam direct melting; powder bed fusion AM processes, including direct metal laser sintering, selective laser sintering, selective laser melting, electron beam melting; and other methods, for example those in which a melt pool is produced and solidified; fused-filament fabrication, direct-write, etc.

According to another aspect of the invention, an apparatus configured to perform the method of combining a prefabricated article with another article according to any of the preceding features, in particular, an electron beam additive manufacturing apparatus or a laser beam additive manufacturing apparatus.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, or 0.01% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "having," "involving," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of additive manufacturing, comprising:
providing a raw material in solid state form;
exposing the raw material to a leading energy beam thereby liquefying the raw material;
forming a melt pool with the liquefied raw material, the melt pool having a leading region and a trailing region; and
exposing the trailing region of the melt pool to a trailing energy beam;
wherein a distance between the trailing energy beam and the leading energy beam varies as the trailing energy beam trails the leading energy beam;
wherein the distance between the trailing energy beam and the leading energy beam varies between at least (i) a first position of the trailing energy beam that is closer to the leading energy beam and (ii) a second position of the trailing energy beam that is further away from the leading energy beam, and wherein the trailing energy beam cycles back to the first position after reaching at least the second position.

2. The method of additive manufacturing according to claim 1, wherein the forming the melt pool with the liquefied raw material is performed as the leading energy beam moves in a travel direction along an x-y plane;

wherein the leading region of the melt pool is proximal to the leading energy beam as the leading energy beam moves in the travel direction; and wherein the trailing region of the melt pool trails the leading region as the leading energy beam moves in the travel direction.

3. The method of additive manufacturing according to claim 1, further comprising:

solidifying the melt pool to form a re-solidified layer that trails the trailing region as the trailing energy beam moves in the travel direction; and repeating at one or more locations for building a three-dimensional structure re-solidified layer by re-solidified layer.

4. The method of additive manufacturing according to claim 1, wherein the raw material is a metal or metal alloy; and wherein the trailing region exposed to the trailing energy beam includes a solid-liquid phase.

5. The method of additive manufacturing according to claim 1, wherein the trailing energy beam has a power level, power density, and/or pulsation that is configured to prevent hot cracking as the melt pool solidifies by disrupting a dendritic microstructure in the trailing region of the melt pool.

6. The method of additive manufacturing according to claim 1, wherein the trailing region of the melt pool includes a liquid interface, a solid interface, and a transition region between the liquid interface and the solid interface; and wherein the trailing energy beam is configured in a pattern that corresponds to a shape of the transition region along an x-y plane.

7. The method of additive manufacturing according to claim 1, wherein the trailing energy beam is configured in a pattern selected from the group consisting of: chevron-shaped, arc-shaped, crescent-shaped, or parabolic-shaped.

8. The method of additive manufacturing according to claim 1, wherein the trailing energy beam is spaced apart from the leading energy beam so that the trailing energy beam is maintained in a transition region of the trailing region, the transition region being between a liquid interface and a solid interface of the melt pool and including a solid-liquid phase.

9. The method of additive manufacturing according to claim 1, wherein the trailing energy beam has a power level, power density, and/or pulsation that is configured to agitate the trailing region of the melt pool for reducing hot cracking and/or porosity when the melt pool solidifies.

10. The method of additive manufacturing according to claim 9, wherein the trailing energy beam has a power level, power density, and/or pulsation that is configured to redistribute liquid constituents in the trailing region of the melt pool so as to replenish lost volume at solidifying regions of the melt pool.

11. The method of additive manufacturing according to claim 1, wherein the raw material is a metal wire.

12. The method of additive manufacturing according to claim 1, wherein the trailing energy beam has a power level, power density, voltage potential, and/or current that is different than a power level, power density, voltage potential, and/or current of the leading energy beam.

13. The method of additive manufacturing according to claim 1, wherein the combined power levels of the leading energy beam and the trailing energy beam represents a total power level, and wherein the total power level is in the range of 1 kW to 10 kW.

14. The method of additive manufacturing according to claim 1, further including the steps:

solidifying the melt pool to form a re-solidified layer;

exposing the re-solidified layer to the trailing energy beam for stress relieving and/or annealing the re-solidified layer.

15. A method of tailoring the properties of a pre-existing article, comprising:

utilizing the additive manufacturing process according to the method of claim 1;

wherein the composition of the raw material is different than a material that forms a major component of the pre-existing article, the composition of the raw material being tailored to provide unique qualities to the pre-existing article.

16. The method of additive manufacturing according to claim 1 being selected from the group consisting of:

i) direct energy deposition, including direct metal deposition, laser deposition wire, laser deposition powder, laser consolidation, laser engineering net shape, electron beam direct melting;

ii) powder bed fusion, including direct metal laser sintering, selective laser sintering, selective laser melting, electron beam melting; and iii) other additive manufacturing methods in which a melt pool is produced and solidified.

17. The method of additive manufacturing according to claim 1, wherein the raw material is an aluminum alloy having aluminum as a major component.

18. The method of additive manufacturing according to claim 1, wherein the melt pool is autogenously formed and solidified independent of adding a separate filler material to the melt pool that is different from the raw material.

19. The method of additive manufacturing according to claim 1, wherein:

the providing the raw material in solid state form includes providing a metal alloy in solid state form, the metal alloy having a plurality of alloying agents; and the exposing the raw material to the leading energy beam thereby liquefying the raw material includes heating the metal alloy to a processing temperature that is beyond the melting point of the metal alloy;

wherein the additive manufacturing is conducted in a vacuum chamber;

wherein one of the plurality of alloying agents has a highest vapor pressure at the processing temperature among the plurality of alloying agents; and wherein a pressure level of the vacuum chamber is equal to or greater than the vapor pressure of the alloying agent having the highest vapor pressure among the plurality of alloying agents.

20. The method of additive manufacturing according to claim 19,
wherein the pressure level of the vacuum chamber is in the range of 500 microtorr to 3,000 microtorr.

21. The method of additive manufacturing according to claim 19,
wherein the metal alloy is Al 6061 and the processing temperature is in the range of 580 degrees Celsius to 652 degrees Celsius; and
wherein the pressure level of the vacuum chamber is in the range of 2,000 microtorr to 3,000 microtorr.

22. A method of additive manufacturing, comprising:
providing a raw material in solid state form;
exposing the raw material to a leading energy beam thereby liquefying the raw material;
forming a melt pool with the liquefied raw material, the melt pool having a leading region and a trailing region; and
exposing the trailing region of the melt pool to a trailing energy beam;
wherein a distance between the trailing energy beam and the leading energy beam varies as the trailing energy beam trails the leading energy beam,
wherein the additive manufacturing process is conducted in a vacuum chamber;
wherein the raw material is a metal alloy having one or more alloying agents that contribute to increasing strength of the metal alloy;
wherein the one or more alloying agents each have a processing vapor pressure, which is the intrinsic vapor pressure of the alloying agent at a processing temperature, the processing temperature being at a temperature of the melt pool; and
wherein the vacuum chamber is set to a pressure level during the additive manufacturing process, the pressure level being 500 microtorr or greater for reducing vaporization of the one or more alloying agents during the additive manufacturing process.

23. The method of additive manufacturing according to claim 22,
wherein the pressure level is equal to or greater than the processing vapor pressure of the one or more alloying agents for reducing vaporization of the one or more alloying agents during the additive manufacturing process.

24. The method of additive manufacturing according to claim 22,
wherein a pressure level of the vacuum chamber is 1,000 microtorr or greater.

25. The method of additive manufacturing according to claim 22,
wherein the vacuum chamber is back-filled with an inert gas.

26. The method of additive manufacturing according to claim 1,
wherein the forming the melt pool with the liquefied raw material includes depositing the liquefied raw material onto a substrate; and
wherein an interpass temperature is maintained at or below a predetermined temperature level.

27. The method of additive manufacturing according to claim 26,
wherein the interpass temperature is maintained at or below the predetermined temperature level by actively cooling a chill plate in thermal communication with the substrate.

28. The method of additive manufacturing according to claim 27,
wherein the actively cooling the chill plate includes circulating a chilled fluid through fluid passages in the chill plate.

29. A method of electron beam additive manufacturing a three-dimensional article, comprising:
i) providing a raw material as a wire;
ii) feeding the wire of raw material to a feed region with an actuator;
iii) exposing the wire of raw material to a leading electron beam to heat and liquefy the wire to form a liquefied raw material;
iv) forming a melt pool with the liquefied raw material, wherein:
the forming the melt pool with the liquefied raw material is performed such that melt pool overlies a substrate, and the melt pool is formed as at least one of the leading electron beam and the substrate move relative to each other in a travel direction, and
the melt pool has a leading region and a trailing region, the leading region of the melt pool is a liquid-phase region and the trailing region of the melt pool is a transitional solid-liquid phase region between a liquid interface and a solid interface of the melt pool;
v) exposing the trailing region of the melt pool to a trailing electron beam having a different characteristic than the leading electron beam;
vi) solidifying the melt pool to form a re-solidified layer that trails the melt pool; and
vii) building the three-dimensional article re-solidified layer by re-solidified layer.

30. A method of additive manufacturing, comprising:
providing a raw material in solid state form;
exposing the raw material to a leading energy beam thereby liquefying the raw material;
forming a melt pool with the liquefied raw material, the melt pool having a leading region and a trailing region; and
exposing the trailing region of the melt pool to a trailing energy beam;
wherein a distance between the trailing energy beam and the leading energy beam progressively increases at one or more intermediate distances between a first distance and a second distance;
and wherein the trailing energy beam cycles back to the first distance after reaching the second distance.

31. A method of additive manufacturing, comprising:
providing a raw material in solid state form;
exposing the raw material to a leading energy beam thereby liquefying the raw material;
forming a melt pool with the liquefied raw material, the melt pool having a leading region and a trailing region; and
exposing the trailing region of the melt pool to a trailing energy beam;
wherein a distance between the trailing energy beam and the leading energy beam varies as the trailing energy beam trails the leading energy beam, and
wherein the trailing energy beam has a power level, power density, and/or pulsation that is configured to prevent hot cracking as the melt pool solidifies by disrupting a dendritic microstructure in the trailing region of the melt pool.

* * * * *